US009471448B2

(12) United States Patent
Williams et al.

(10) Patent No.: US 9,471,448 B2
(45) Date of Patent: Oct. 18, 2016

(54) PERFORMING AN ATOMIC WRITE OPERATION ACROSS MULTIPLE STORAGE DEVICES

(71) Applicant: INTEL CORPORATION, Santa Clara, CA (US)

(72) Inventors: Dan J. Williams, Forest Grove, OR (US); Bryan E. Veal, Beaverton, OR (US); Annie Foong, Aloha, OR (US); Sanjeev N. Trika, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 68 days.

(21) Appl. No.: 14/566,636

(22) Filed: Dec. 10, 2014

(65) Prior Publication Data

US 2016/0170850 A1 Jun. 16, 2016

(51) Int. Cl.
| G06F 11/00 | (2006.01) |
| G06F 11/20 | (2006.01) |
| G06F 3/06 | (2006.01) |

(52) U.S. Cl.
CPC ........... *G06F 11/2069* (2013.01); *G06F 3/064* (2013.01); *G06F 3/065* (2013.01); *G06F 3/0619* (2013.01); *G06F 3/0689* (2013.01)

(58) Field of Classification Search
CPC ........... G06F 11/2053; G06F 11/2069; G06F 3/0619; G06F 3/064; G06F 3/065; G06F 3/0689
See application file for complete search history.

(56) References Cited

U.S. PATENT DOCUMENTS

| 5,774,643 A | * | 6/1998 | Lubbers | G06F 11/1076 711/114 |
| 7,636,814 B1 | | 12/2009 | Karr et al. | |
| 8,443,153 B1 | * | 5/2013 | Edwards | G06F 17/30091 711/147 |
| 9,274,720 B1 | * | 3/2016 | Ori | G06F 3/0653 |
| 2002/0091903 A1 | * | 7/2002 | Mizuno | G06F 3/0605 711/154 |
| 2002/0161970 A1 | * | 10/2002 | Busser | G06F 11/1076 711/114 |
| 2003/0196052 A1 | | 10/2003 | Bolik et al. | |
| 2010/0114847 A1 | | 5/2010 | Giampaolo et al. | |
| 2013/0332655 A1 | | 12/2013 | Kandiraju et al. | |

FOREIGN PATENT DOCUMENTS

WO 2012/142027 10/2012

OTHER PUBLICATIONS

Avago Technologies, "Storage Solutions Product Guide", Copyright © 2013-2014 Avago Technologies, Total 12 pp.

(Continued)

*Primary Examiner* — Joshua P Lottich
(74) *Attorney, Agent, or Firm* — Konrad Raynes Davda & Victor LLP; David W. Victor

(57) ABSTRACT

Provided are a computer program product, system, and method performing an atomic write operation across multiple storage devices. A determination is made of a plurality of storage devices on which to write data for a write operation. A tag is generated to uniquely identify the write operation. A write command is sent to each of the determined storage devices including the tag and write data to cause each of the storage devices to write the write data at the storage device. Each of the storage devices maintains a copy of a previous version of the data to be updated by the write operation. A revert command is sent with the tag to one of the storage devices to cause the storage device to restore the copy of the previous version of the write data at the storage device.

25 Claims, 13 Drawing Sheets

(56) References Cited

OTHER PUBLICATIONS

Bonwick, J., "RAID-Z", [online], Nov. 17, 2005, [Retrieved on Nov. 9, 2014], retrieved from the Internet at <URL: https://blogs.oracle.com/bonwick/entry/raid_Z>, 5 pp.

"Closing the RAID5 Write Hole", Jun. 14, 2011, [online], [Retrieved on Dec. 10, 2014]. Retrieved from the Internet at <URL: http://neil.brown.name/blog/20110614101708>, Total 9 pp.

LSI Corporation, "LSI Product Brief", Copyright © 2013 by LSI Corporation, Total 2 pp.

Rodeh, O., "B-trees, Shadowing, and Clones", IBM Haifa Research Labs, ACM Transactions on Computational Logic, vol. V, No. N, Aug. 2007, Total 26 pp.

Rodeh, O., "B-Trees, Shadowing, and Clones" (PDF)—Ohad Rodeh static.usenix.org/event/lsf07/tech/rodeh.pdf B-trees, Shadowing, and Clones Ohad Rodeh B-trees, Shadowing, and Clones Œ p. 1/51 with a download date of Nov. 21, 2014, Total 51 pp.

SANAPPTX, "RAID-Z", [online], © 2014, [Retrieved on Nov. 9, 2014], Retrieved from the Internet at <URL: http://sanapptx.com/resources/why-zfs/raid-z/>, 1 pg.

International Search Report and Written Opinion for International Application No. PCT/US2015/060478, dated Mar. 31, 2016, 16 pp. (77.309 {ISR & WO)].

* cited by examiner

Write Status Entry

Write Status Entry

PERFORMING AN ATOMIC WRITE OPERATION ACROSS MULTIPLE STORAGE DEVICES

TECHNICAL FIELD

Embodiments described herein generally relate to a host system storing data across multiple storage devices by performing an atomic write operation across the storage devices.

BACKGROUND

Redundant Array of Independent Disk (RAID) controllers stripe data to multiple storage drives and calculate parity data from the data written to the drives in the RAID stripes (typically by XOR'ing the striped data) to write to a parity disk. One potential problem with RAID implementations is known as a RAID write hole. A write hole occurs when data in a RAID stripe is updated, but the parity data is not updated so that all disks XOR to zero in order to reconstruct data when a disk fails. The problem is that there is no way to update two or more disks atomically, so RAID stripes can become damaged during a crash or power outage. To address this problem, RAID controllers maintain non-volatile storage devices, also known as NVRAMs, to backup the write data until the parity data can be written. However, adding NVRAMs increases the cost of RAID controllers and RAID solutions. RAID software implementations have not been known to successfully address the write hole problem without having significant performance issues.

There is a need in the art to provide improved solutions to writing data across multiple storage devices, such as with a RAID storage solution, that allows for recovery of the data in case of a failure.

BRIEF DESCRIPTION OF THE DRAWINGS

Embodiments are described by way of example, with reference to the accompanying drawings, which are not drawn to scale, in which like reference numerals refer to similar elements.

DESCRIPTION OF EMBODIMENTS

Figure 1:
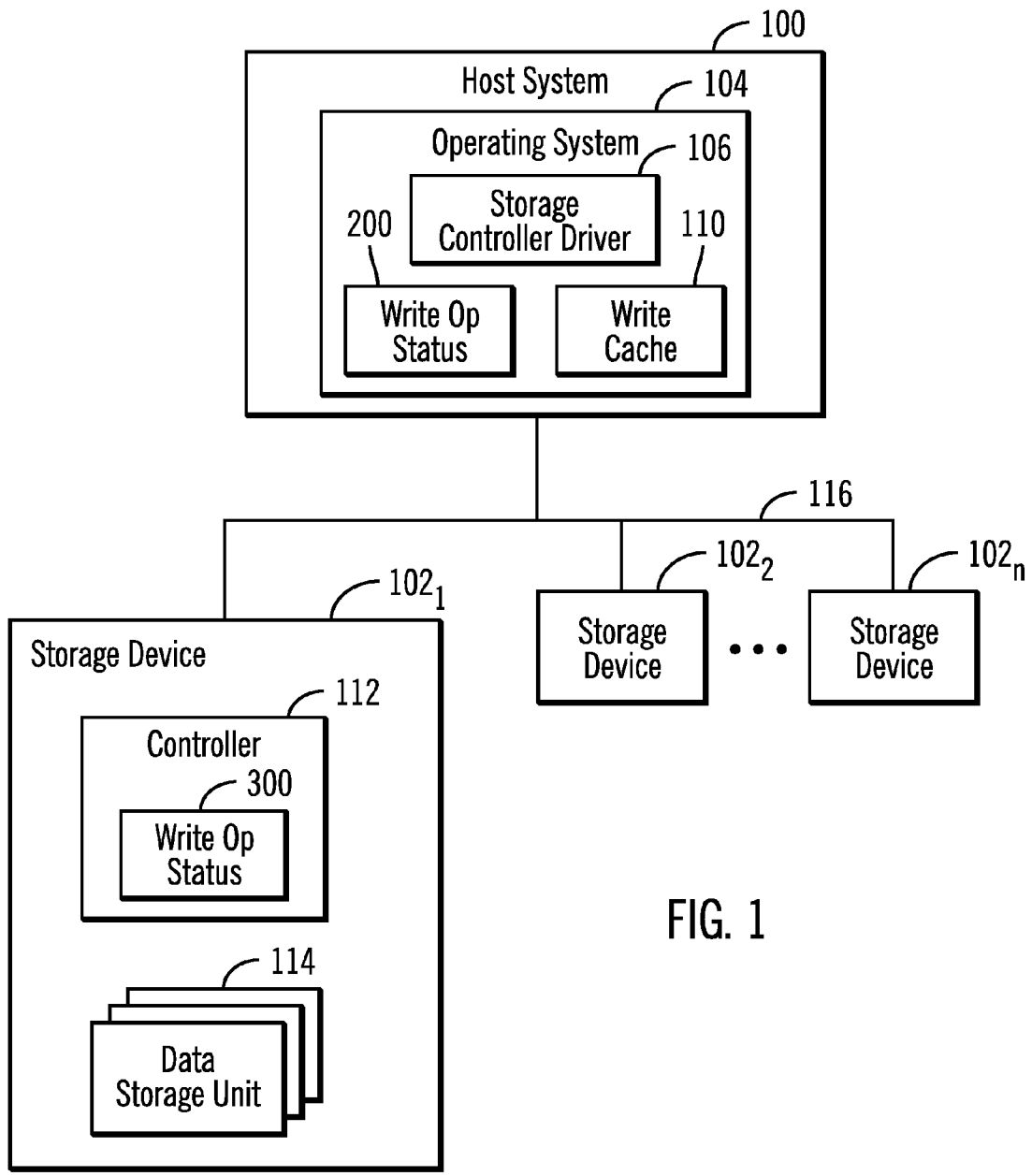
FIG. 1 illustrates an embodiment of a storage system in which a host system stores data across multiple storage devices.

Current RAID controllers address the write hole data corruption problem by having a write back cache implemented in expensive NVRAM devices to cache partially written data. However, such solutions require the use of NVRAMs, which may be one of the most expensive components of the RAID controller. Further, the use of NVRAM for a write back cache may cause a bottleneck when the underlying storage devices have a read and write performance approaching the performance of the NVRAM devices, such as the case with solid state storage drives (SSDs).

Described embodiments provide techniques to implement a RAID or other storage controller that protects against write holes and silent data corruption while avoiding the use of NVRAM devices by offloading the storing of partially written data to the storage devices themselves. The storage or RAID controller coordinates with the distributed storage devices to ensure atomic updates to the storage devices without the need of a separate write back cache or a commit log device to store the partially written data.

Described embodiments provide a device distributed solution for updating multiple discontiguous blocks of data across multiple devices in an atomic manner. At any given point in time during the update of data, the storage controller, which may be implemented in software in the host system, can assert that the entire operation completes in whole or not at all by offloading the storing of the partially or fully written data at the storage devices. In the case of SSDs, their read and write rates can approximate that of an NVRAM. Thus, described embodiments do not need an NVRAM to backup the partially written data, which is offloaded to the storage devices, SSDs. In this way, when the storage devices are fast access devices, such as SSDs, there will be no bottleneck introduced by the NVRAM because the SSDs will be used in atomic write operations to store the partially written data and previous version of the data.

Storage devices implementing the described embodiments provide a mechanism for a storage controller, such as a software RAID controller, to register the intent in the storage devices to backup a previous version of the data. This "intent" indicates that the storage drives will provide the data that is needed for recovery in the event of an interruption to the writes. While an intent entry is open for a write operation, the storage devices maintain an "old" and "new" copy of the listed data blocks. Once the write completes the intent entry and old data in each device can be discarded. However, if the write is interrupted, there is sufficient distributed metadata across all the participating storage devices and the storage controller for a RAID implementation, multi-device file system, or database to either roll the transaction forward to completion, or rollback to a previous state/data. Consumers of the described embodiment storage system experience the write request completing in its entirety or not at all.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Certain embodiments relate to storage devices electronic assemblies. Embodiments include both devices and methods for forming electronic assemblies.

FIG. 1 illustrates an embodiment of a storage environment having a host system 100 which stores data, such as user data that may be communicated from other attached computer systems and devices, to multiple storage devices $102_1, 102_2 \ldots 102_n$. The host system 100 includes an operating system 104 including a storage controller driver 106 to manage the storage of data in the storage devices $102_1, 102_2 \ldots 102_n$. The storage controller driver 106 maintains write operation status information 200 having information on the data distributed to the storage devices $102_1, 102_2 \ldots 102_n$ for storage and a write cache 110 that buffers the data sent to the storage devices $102_1, 102_2 \ldots 102_n$ until a storage device confirms that the data has been written.

In one embodiment, the storage controller driver 106 may implement Redundant Array of Independent Disk (RAID) algorithms stripe to portions of a data unit to a plurality of the storage devices storage devices $102_1, 102_2 \ldots 102_n$, calculate parity data for the striped data units, and store the parity data in one of the storage devices $102_1, 102_2 \ldots 102_n$. The parity data may comprise XOR parity data to perform parity error recovery if one the storage devices $102_1, 102_2 \ldots 102_n$ having the data fails. The storage controller driver 106 may implement different RAID algorithms, including interleaving, etc.

In the embodiment of FIG. 1, the storage controller driver 106 comprises a software component of the operating system 104. In an alternative embodiment, the storage controller driver 106 may be implemented in a hardware device or separate hardware controller or card which may be connected to the host system 100 through an internal bus.

Each storage device $102_1, 102_2 \ldots 102_n$ includes a controller 112 that manages the writing of data to one or more data storage units 114, including communicating and receiving read and write commands from the host system 100. The controller 112 maintains write operation status 300 having information on the status of write requests sent by the host system 100. The controller 112 may also include a queue to queue read and write requests from the host system 100.

In one embodiment, the storage devices storage device $102_1, 102_2 \ldots 102_n$ may comprise a solid state drive (SSD), flash drive, etc. For SSD implementations, the data storage units 114 may comprise NAND dies of flash memory cells. In one embodiment, the NAND dies may comprise a multilevel cell (MLC) NAND flash memory that in each cell records two bit values, a lower bit value and an upper bit value. Alternatively, the NAND dies may comprise single level cell (SLC) memories or three bit per cell (TLC) memories. The storage units 114 may also comprise, but not limited to, MLC NAND flash memory, ferroelectric random-access memory (FeTRAM), nanowire-based non-volatile memory, three-dimensional (3D) crosspoint memory such as phase change memory (PCM), memory that incorporates memristor technology, Magnetoresistive random-access memory (MRAM), Spin Transfer Torque (STT)-MRAM, a single level cell (SLC) Flash memory, energy source backed (battery/super-capacitor) DRAM, and other electrically erasable programmable read only memory (EEPROM) type devices. In an alternative embodiment, the storage devices $102_1, 102_2 \ldots 102_n$ may comprise other types of storage devices, such as a hard disk drives, etc. In embodiments, where the storage devices $102_1, 102_2 \ldots 102_n$ comprise hard disk drives, the data storage unit 114 may comprise the magnetic disk.

The host 100 may communicate with the storage devices $102_1, 102_2 \ldots 102_n$ over an interface 116 such as a bus interface. The host 100 and storage devices $102_1, 102_2 \ldots 102_n$ may be located in a same enclosure or separate enclosures. Alternatively, the host system 100 may communicate with the storage devices storage devices $102_1, 102_2 \ldots 102_n$ over a network.

The host 100 and storage devices $102_1, 102_2 \ldots 102_n$ may include Input/Output (I/O) interfaces to allow communication therebetween, such as a Serial Advanced Technology Attachment (SATA) interface and include a SATA compliant bus coupling the host 100 and the storage device 102. In other embodiments, other types of I/O interfaces and bus interconnects may be used, such as Serial Attached Small Computer System Interface (SCSI) (or simply SAS), Peripheral Component Interconnect Express (PCIe), etc.

Figure 2:
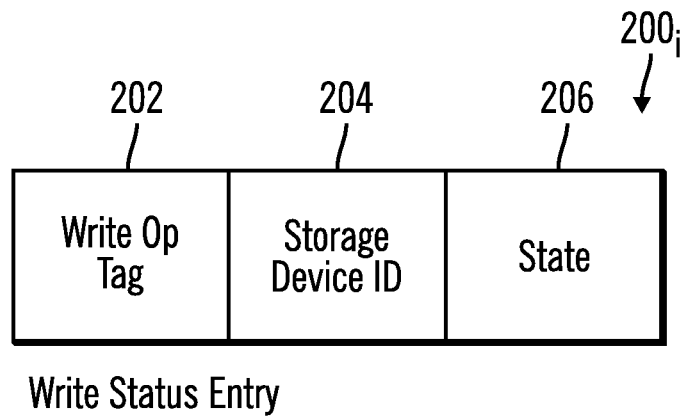
FIG. 2 illustrates an embodiment of a write status entry maintained by the host system for write operations and storage devices.

FIG. 2 illustrates an embodiment of a write operation status entry 200, the storage controller driver 106 maintains for each write operation opened with respect to one of the storage devices storage devices $102_1, 102_2 \ldots 102_n$. Each entry 200, may have a write operation tag 200 providing a unique identifier of a write operation, which may have tracks or blocks of data striped across multiple storage devices $102_1, 102_2 \ldots 102_n$; a storage device identifier (ID) identifying the storage device $102_1, 102_2 \ldots 102_n$ to which the write operation identified by the tag 200 is directed; and a state 206 of the write operation.

If a write operation involves writing portions of a data unit to multiple of the storage devices $102_1, 102_2 \ldots 102_n$, then there may be multiple write status entries 200, for each write operation, each of these entries providing the status for the identified write operation with respect to one of the storage devices $102_1, 102_2 \ldots 102_n$ having received data for the write operation tag 202.

The state 206 may indicate a state of the write operation with respect to one of the storage devices $102_1, 102_2 \ldots 102_n$, including, but not limited:

IDLE state indicates that the storage device 204 has not yet accepted the OPEN command to indicate intent logging. A storage device acknowledging intent logging is committed to make a copy of a previous version of the write data before updating the data and maintain that previous version until the write operation completes, i.e., the atomic operation completes.

OPEN state indicates that the storage device 204 has acknowledged it has received the OPEN command identifying the write operation tag 202, which indicates the storage device 204 has acknowledged the intent to write and is prepared to save the previous version of the data before it is updated for the identified write operation.

DIRTY state is used when a write operation 202 is comprised of multiple write commands, each for a portion of the extent or the data unit to write at the specified storage device 204. A DIRTY state for one of the write commands writing a portion of the data indicates that that portion of the write data was written to the storage device 204. Write status entries 200, for writes for portions of the data having the OPEN state indicate that that particular portion did not complete.

WRITTEN state indicates that the writing required for the write operation 202 to the specified storage device 204 completed. In the case where only one write command was sent for the write operation 202, WRITTEN is indicated when the storage device 204 confirms that it has completed the write. In the case where the write operation 202 to the storage device 204 is comprised of a plurality of write commands, e.g., sub-write commands, WRITTEN of the write operation 202 is indicated when all the component write commands for portions of the data have completed at the storage device 204.

REVERT state indicates that a REVERT command was sent to the storage device 204 to roll-back the data updated by the write operation 202 to the previous version that was logged.

CLOSE state indicates that the storage device 204 has acknowledge acceptance of the CLOSE command to cause the storage device 204 to clear all logged previous versions of data and state information for the write operation 202.

Figure 3:
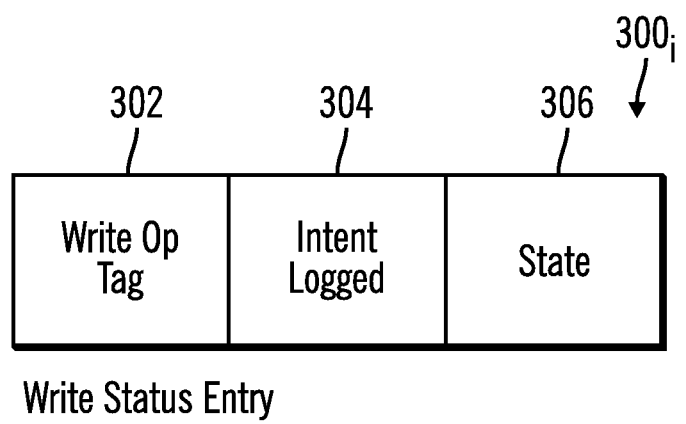
FIG. 3 illustrates an embodiment of a write status entry maintained by the storage devices for a write operation.

FIG. 3 illustrates an embodiment of a write operation status entry 300, that each of the storage devices $102_1$, $102_2 \ldots 102_n$ maintain for each write operation opened by the storage controller driver 106. Each entry 300, may have a write operation tag 300 providing a unique identifier of a write operation, which may have tracks or blocks of data striped across multiple storage devices $102_1$, $102_2 \ldots 102_n$; an intent logged flag 304 indicating the intent of the storage device to maintain a copy of a previous version of the data that is updated; and a state 306 of the write operation, which may comprise one of the states described above.

In alternative embodiments, the storage controller driver 106 may not maintain explicit write operation status 200 information during the operations. Instead, the storage devices $102_1$, $102_2 \ldots 102_n$ maintain the status 300, and the storage controller driver 106 would obtain the status from the storage devices $102_1$, $102_2 \ldots 102_n$ when needed to handle an interruption to write operations.

The storage controller driver 106 may submit the below commands to the storage devices $102_1$, $102_2 \ldots 102_n$ as part of a write operation to write portions of a data unit or extent to multiple storage devices $102_1$, $102_2 \ldots 102_n$:

OPEN (tag, extents)—instructs the storage device $102_1$, $102_2 \ldots 102_n$ to start a new intent log for the write operation tag to write the identified extents or data units.

CLOSE (tag)—instructs the storage device $102_1$, $102_2 \ldots 102_n$ to close the write operation, and eliminate any state information and logged previous versions of the data maintained for the write operation tag.

WRITE WITH TAG (tag, extents)—also referred to herein as WRITE, instructs the storage device $102_1$, $102_2 \ldots 102_n$ to write the data (extents) for an open write operation (tag).

READ WITH TAG (tag, extents, new)—also referred to herein as READ, instructs the receiving storage device $102_1$, $102_2 \ldots 102_n$ to retrieve either a previous version, write data or mixture of the two for the identified data (extents) for the write operation (tag)

REVERT (tag)—instructs the storage device $102_1$, $102_2 \ldots 102_n$ to roll-back the written data to the logged previous version of the data for the write operation (tag).

Figure 4:
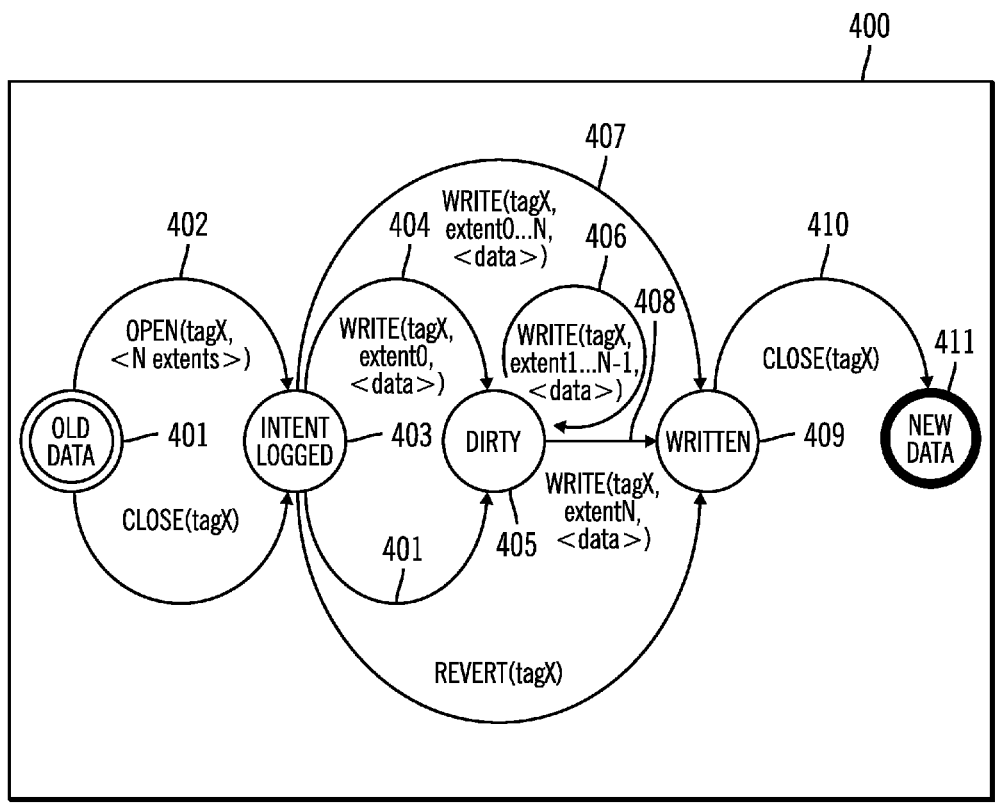
FIG. 4 illustrates a state diagram showing the state transitions within a storage device in response to commands from the host system concerning the writing of data for an atomic write operation.

FIG. 4 illustrates an embodiment of a state diagram 400 describing the different states at the storage devices $102_1$, $102_2 \ldots 102_n$ The old data state 401 shows the state of the data before it is updated. Upon receiving the OPEN command, the state of the receiving storage device $102_1$, $102_2 \ldots 102_n$ transitions 402 to an intent logged state 403 where the storage device $102_1$, $102_2 \ldots 102_n$ saves the previous version of the data before writing the new data. The storage device $102_1$, $102_2 \ldots 102_n$ may write the new data by performing a write-in-place write or use indirection to perform a copy on-write, to copy the old data upon writing. In embodiments where the write operation consists of a series of write commands of portions of the data unit for the storage device, then upon receiving one of the write commands, the state of the receiving storage device $102_1$, $102_2 \ldots 102n$ transitions 404 to a dirty state 405 when a particular write for one of the portions of the data unit completes, but before all the writes for the storage device have completed. In embodiments where the write operation consists of a single write command or after completing all the component write commands, the state transitions 407 and 408, respectively, to the written state 409. Upon receiving the CLOSE command for a write operation (tag), the storage device $102_1$, $102_2 \ldots 102_n$ transitions 410 to the new data state 411. At the new data state 411, the storage device $102_1$, $102_2 \ldots 102_n$ discards or the logged previous version of the data and other information of the write operation (tag), such as the write status entry 300, for the write operation. Alternatively, the storage space having the logged previous version of the data and other related information may be marked as free space and available for garbage collection or reuse.

The state diagram embodiment of FIG. 4 provides atomicity because the write operation does not complete at any of the storage devices $102_1$, $102_2 \ldots 102_n$ until all the storage devices have confirmed that their data has been written, either in a single write command or multiple write commands. Until the point at which the atomic write operation completes, the storage devices $102_1$, $102_2 \ldots 102_n$ maintain partial and full written data as well as a previous version of the data to allow the storage controller driver 106 to roll back the data for all the storage devices to the previous version of the data before the update or the write data of the write operation. Further, in embodiments where parity data is maintained, the storage devices $102_1$, $102_2 \ldots 102_n$ maintain sufficient information to allow the calculation of parity data before the atomic write operation completes. The implementation of this atomic write operation between the storage controller driver 106 and storage devices $102_1$, $102_2 \ldots 102_n$ is described in detail below.

Figure 5A:
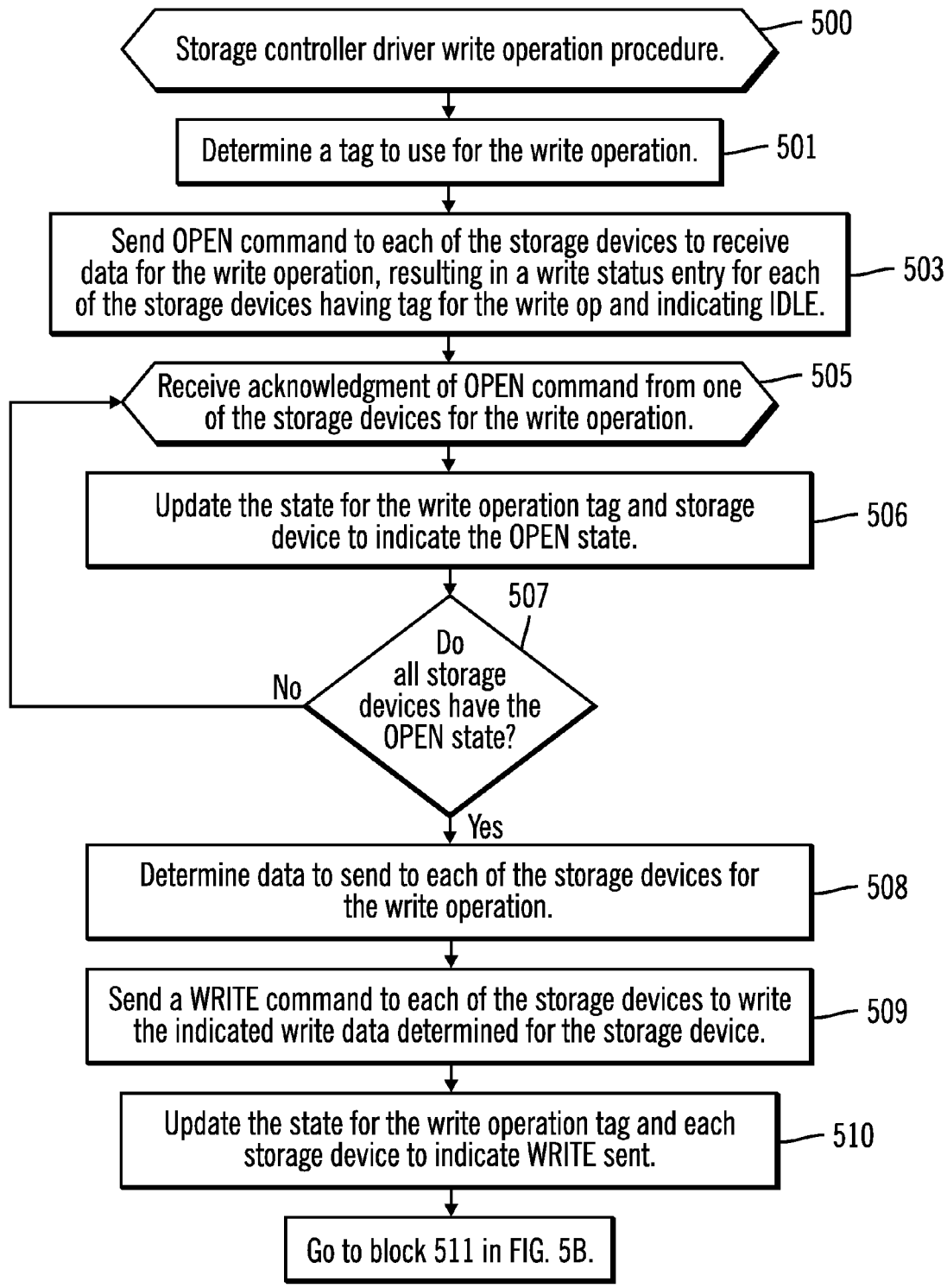
FIGS. 5a and 5b illustrate an embodiment of operations performed by the storage controller driver to implement a write operation to write data across multiple storage devices.
Figure 5B:
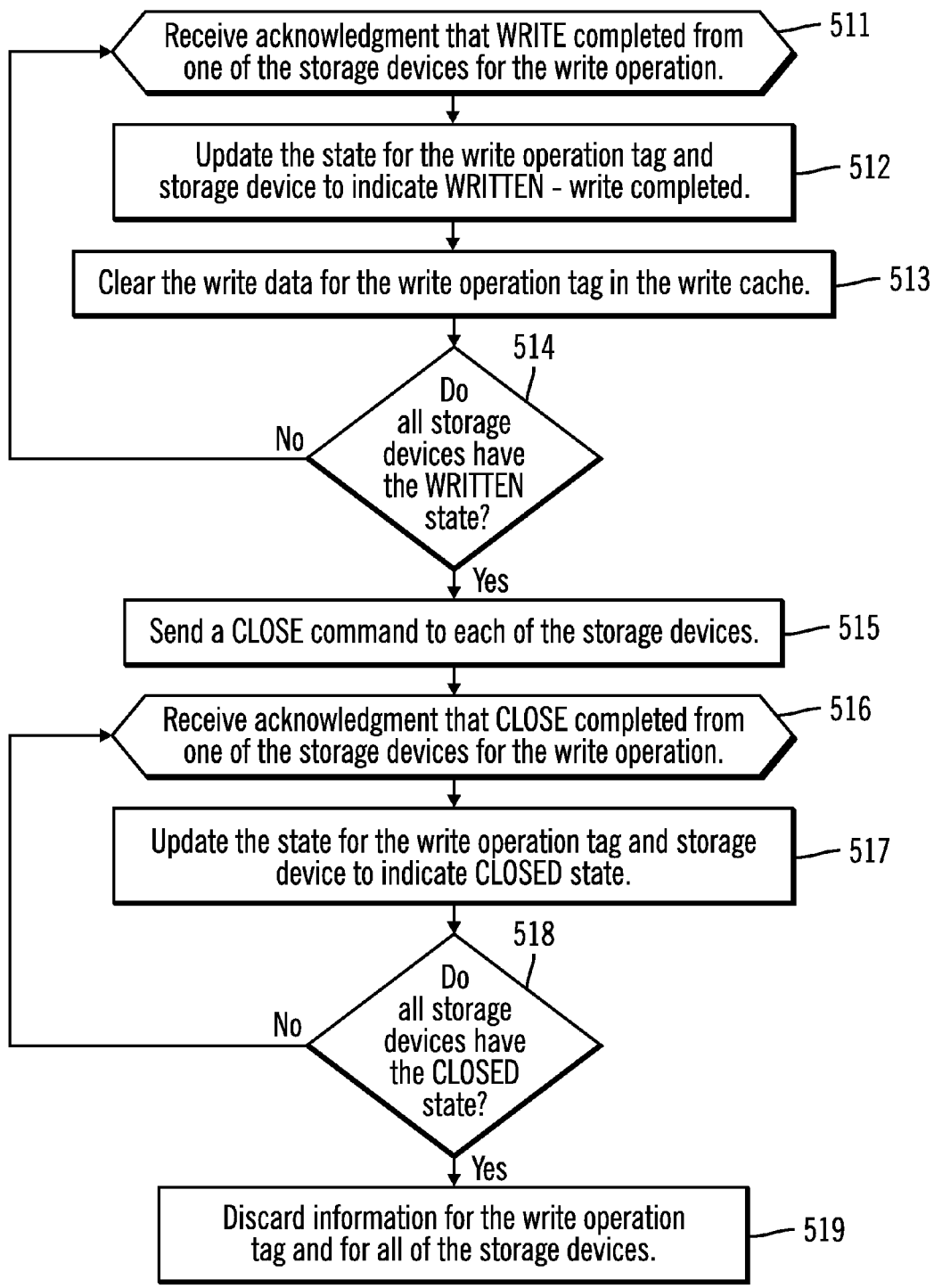

FIGS. 5a and 5b illustrate an embodiment of operations performed by the storage controller driver 106 to manage the atomic write operation having write data, e.g., data units, tracks, extents, to write or stripe across multiple storage devices $102_1$, $102_2 \ldots 102_n$. Upon initiating (at block 500) the procedure for the atomic write operation, the storage controller 106 determines (at block 501) a tag to use to uniquely identify the write operation. The storage controller driver 106 sends (at block 503) an OPEN command to each of the storage devices $102_1, 102_2 \ldots 102_n$ to receive data for the write operation to instruct the storage devices $102_1, 102_2 \ldots 102_n$ to start intent logging to store a previous version of the data to be updated. Sending the OPEN command results in the storage controller driver 106 creating a write status entry $200i$ for each storage device $102_1, 102_2 \ldots 102_n$ to which data for the write operation will be sent having a status of IDLE. If the write operation will involve multiple write commands for portions of the data for each storage device, then the storage drive controller 106 may provide a write status entry 200, having a status of IDLE for each of the write commands writing a portion of the data in order to provide separate status for each of the write commands for the portions of the data for the storage device $102_1, 102_2 \ldots 102_n$.

Upon receiving (at block 505) acknowledgment of the OPEN command from one of the storage devices $102_1, 102_2 \ldots 102_n$ for the write operation, the storage controller driver 106 updates (at block 506) the status 206 for the write operation tag and storage device $102_1, 102_2 \ldots 102_n$ to indicate OPEN. If (at block 507) all of the storage devices $102_1, 102_2 \ldots 102_n$ do not have the OPEN state, then the storage controller driver 106 returns to block 505 to wait for acknowledgment of the OPEN command from other of the storage devices $102_1, 102_2 \ldots 102_n$ to insure that all storage devices $102_1, 102_2 \ldots 102_n$ acknowledge they will engage in intent logging. If (at block 507) all storage devices $102_1, 102_2 \ldots 102_n$ have acknowledged the OPEN state, then the storage controller driver 106 determines (at block 508) data to send to each of the storage devices $102_1, 102_2 \ldots 102_n$ for the write operation. This operation may involve determining portions of a data unit to write across multiple storage devices. In RAID implementations, this operation may determine data to stripe to each of the storage devices $102_1, 102_2 \ldots 102_n$ and a calculated XOR parity data for one or more of the storage devices $102_1, 102_2 \ldots 102_n$ storing the XOR parity data. Further, this determination may further break the portion of data to write for each of the storage devices into multiple write commands to write each portion of the data for each storage device $102_1, 102_2 \ldots 102_n$.

The storage controller driver 106 sends (at block 509) a WRITE (or WRITE WITH TAG) command to each of the storage devices to write the indicated write data determined for the storage device. The state 206 is updated (at block 510) for the write operation tag and each of the storage devices $102_1, 102_2 \ldots 102_n$ receiving one or more write commands to indicate that the write was sent. In one embodiment, the OPEN state for a storage device having received the WRITE command would indicate the write was sent but has not completed.

Control then proceeds to block 511 in FIG. 5b where the storage controller driver 106 receives (at block 511) acknowledgment that the write completed from one of the storage devices for the write operation tag. The state for the write operation tag and acknowledging storage device is updated (at block 512) to indicate that the write completed, which may be the WRITTEN state. The storage controller driver 106 may then clear (at block 513) the data for that completed write operation in the write cache 110. At this point, the copy of the write data is maintained at the storage device $102_1, 102_2 \ldots 102_n$ and the storage controller driver 106 does not need to maintain partially written data. If the write operation involved multiple write commands for one storage device, then the storage controller driver 106 may discard the portion of the data for the write command, but retain portions of the data to write for the storage device for write commands for which acknowledgment has not been received. If (at block 514) there are some storage devices $102_1, 102_2 \ldots 102_n$ receiving the write command that have not acknowledged write complete state, e.g., the WRITTEN state, then control proceeds back to block 511 to wait for further write complete acknowledgment from all the storage devices $102_1, 102_2 \ldots 102_n$ For a write operation involving sending multiple write commands to each of the storage devices $102_1, 102_2 \ldots 102_n$, control proceeds back to block 511 if not all of the write commands for portions of the data have completed.

If (at block 514) all writes have completed at all the storage devices $102_1, 102_2 \ldots 102_n$ receiving write data for the write operation, then the storage controller driver 106 sends (at block 515) a CLOSE command to each of the storage devices $102_1, 102_2 \ldots 102_n$ identified in the write status entries 200, for the write operation tag. Upon receiving (at block 516) acknowledgment that the CLOSE command completed from one of the storage devices $102_1, 102_2 \ldots 102_n$ for the write operation, the storage controller driver 106 updates (at block 517) the state 206 in the write status entry 200, for the write operation tag 202 and the acknowledging storage device 204 to indicate the CLOSE status. If (at block 518) not all storage devices $102_1, 102_2 \ldots 102_n$ have acknowledged processing of the CLOSE command, then control proceeds back to block 516 to wait for acknowledgment of the CLOSE command from other of the storage devices $102_1, 102_2 \ldots 102_n$ If (at block 518) all of the storage devices $102_1, 102_2 \ldots 102_n$ that were sent the CLOSE command return acknowledgment, then the storage controller driver 106 may discard (at block 519) any information for the write operation tag, such as all the write status entries 200, for the write operation tag and each of the storage devices $102_1, 102_2 \ldots 102_n$. Alternatively, the storage controller driver 106 may indicate the information for the write operation for all the storage devices as free space for later garbage collection or reuse.

In an alternative embodiment, the operations at blocks 518 and 519 are not performed, and the CLOSE is indicated for each storage device $102_1, 102_2 \ldots 102_n$ asynchronously when the acknowledgment is received for the first time, because all devices have written the data by the time the first CLOSE state acknowledgment is received. In a further alternative embodiments, the storage controller driver 106 does not maintain the state information based on the acknowledgments received from the storage devices $102_1, 102_2 \ldots 102_n$, and only obtains such state information when needed when querying the storage devices $102_1, 102_2 \ldots 102_n$ for the state information when there is an interruption to write operations or other failure.

With the operations of FIGS. 5a and 5b, the storage controller driver 106 does not need to maintain all the write data and previous version of the write data until the entire write operation is confirmed as completed. Instead, once data is written to the storage device $102_1, 102_2 \ldots 102_n$, the data for that storage device $102_1, 102_2 \ldots 102_n$ may be discarded because the atomic write is assured that each of the storage devices $102_1, 102_2 \ldots 102_n$ maintain a previous copy of the data and the current write data to allow for rolling back or for completing the write. Further, if parity data is calculated, the storage devices maintain the partially written data to allow for recalculation of the parity data to roll forward and complete the writing of the non-parity and parity data for the write operation. As discussed, the parity data may comprise erasure code parity data, such as XOR parity and other parity data, that can be used for data recovery if one of the storage devices fails.

Figure 6:
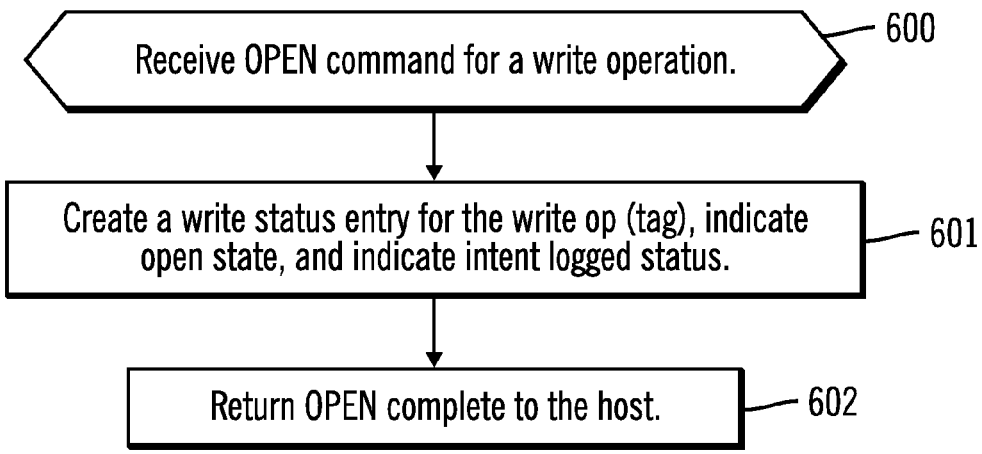
FIG. 6 illustrates an embodiment of operations performed by a storage device to process an OPEN command from the host system.

FIGS. 6-9 illustrate operations implemented in the controller 112 of each of the storage devices $102_1, 102_2 \ldots 102_n$ to process the commands from the storage controller driver 106 to implement the atomic write operation. FIG. 6 illustrates an embodiment of operations performed by the controller 112 to process the OPEN command from the storage controller driver 106. In response to receiving (at block 600) the OPEN command specifying a write operation (tag), the storage device controller 112 creates (at block 601) a write status entry 300, identifying the write operation tag 302, indicating the intent logged 304 state indicating that a previous version of data to update as part of the identified write operation tag 302 will be logged and saved, and indicating the state 306 as OPEN. The controller 112 returns (at block 602) OPEN complete state to the host 100. A storage device $102_1, 102_2 \ldots 102_n$ having an OPEN state acknowledges an intent to save the previous version of the updated data and that any sent writes have not been received or have been received but not completed.

Figure 7:
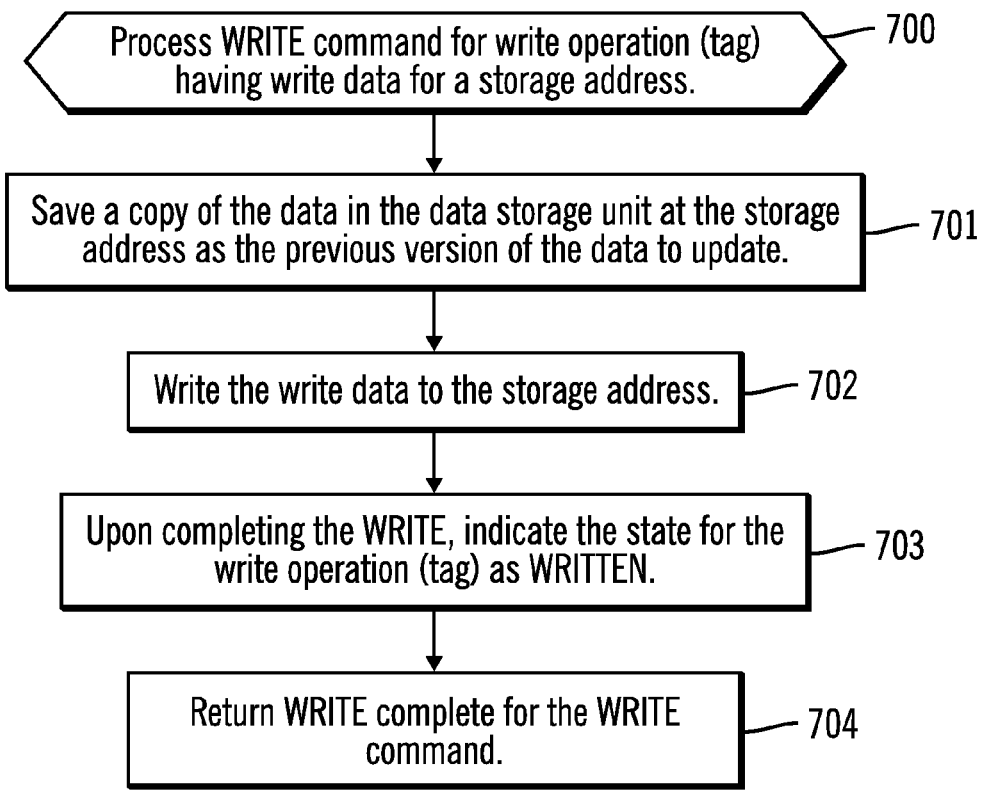
FIGS. 7, 8, and 9 illustrate embodiments of operations performed by a storage device to process a WRITE command from the host system.

FIG. 7 illustrates an embodiment of operations performed by the storage device controller 112 to process a WRITE command for a write operation tag, such as the WRITE WITH TAG. Upon receiving (at block 700) a write command for a write operation (tag) having write data for a logical or physical address addressing a location in the data storage unit(s) 114, the controller 112 saves (at block 701) a copy of the data in the data storage unit 114 at the storage address as the previous version of the data to update. In an alternative copy-on write implementation, the controller 112 can remember where the old data is located and write the new data to a new storage area, and an indirection table allows the location of the old data to be reused. The write data in the write command is written (at block 702) to the storage address. A write may be deemed completed upon writing the data to the actual storage unit 114, such as the case with flash memory, SSDs, etc. or upon buffering the write data in the storage device $102_1, 102_2 \ldots 102_n$ in a buffer separate from the data storage unit 114, where the buffered data is eventually destaged to the data storage unit 114, such as the case with a hard disk drive. Upon completing the write, the controller 112 indicates (at block 703) the state 306 of the write operation as WRITTEN in the write status entry $300_I$ for the write operation 302. Complete is returned (at block 704) to the host 100. The operations of FIG. 7 may be performed when there is just one write command sent for the write operation to each storage device $102_1, 102_2 \ldots 102_n$.

Figure 8:
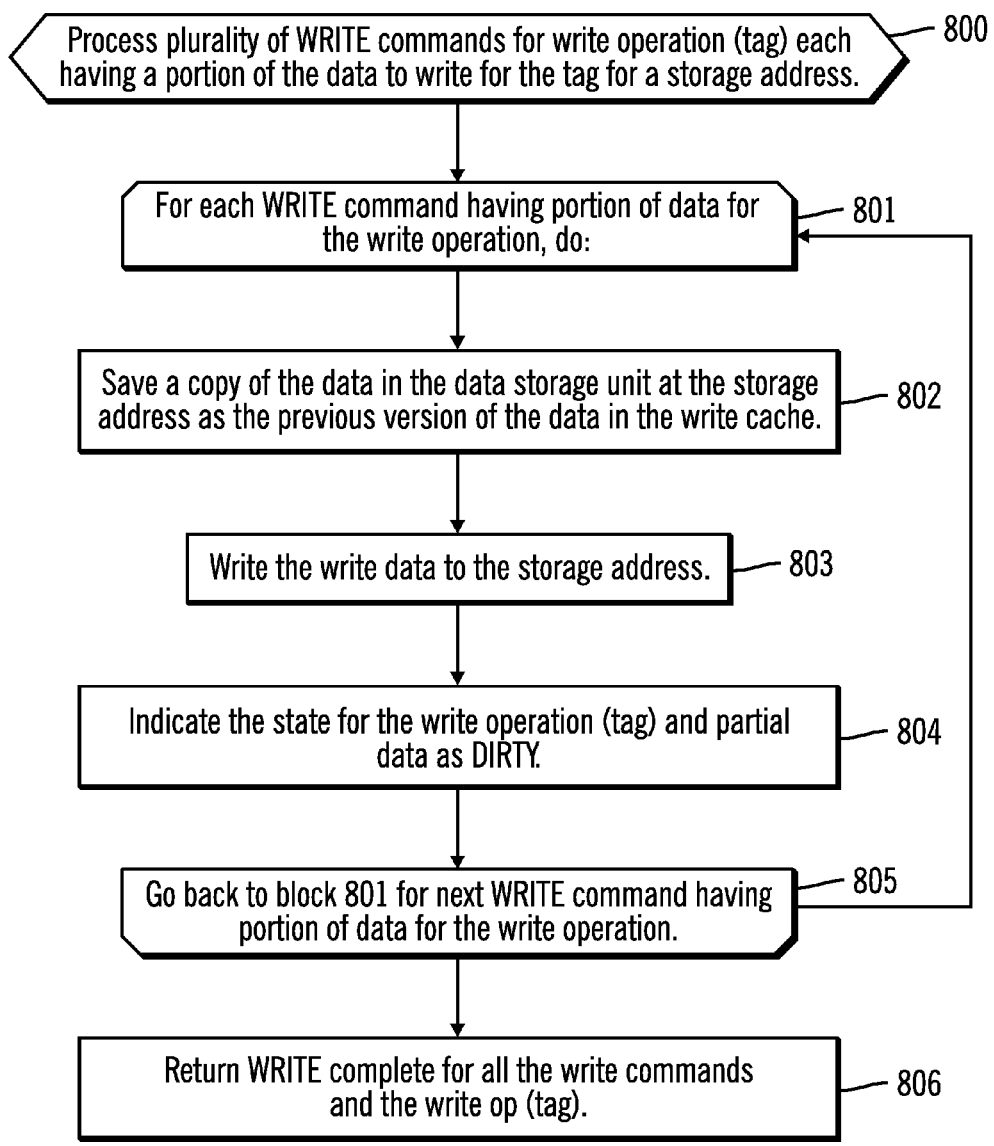

FIG. 8 illustrates an embodiment of operations performed by the storage device controller 112 to process a plurality of WRITE commands, such as the WRITE WITH TAG, to write portions of the data for one storage device and write operation tag. Upon receiving (at block 800) a plurality of write commands, also referred to as sub-write commands, to write portions of the data for the write operation (tag) for a storage address in the data unit(s) 114, the controller 112 performs a loop of operations at blocks 801 through 805 for each WRITE. At block 802, a copy of the data in the data storage unit 114 at the storage address is saved as the previous version of the data to update. In an alternative copy-on write implementation, the controller 112 can remember where the old data is located and write the new data to a new storage area, and an indirection table allows the location of the old data to be reused. The write data in the WRITE command is written (at block 803) to the storage address. Upon completing the WRITE, the controller 112 indicates (at block 804) the state 306 of the write operation and the partial data written as DIRTY in the write status entry $300_I$ for the write operation 302. After completing writing all the portions of the data unit to write for all the write operations, the controller 112 return write complete for the write commands and the write operation (tag) to the host 100.

In the embodiment of FIG. 8, write complete or WRITTEN state is only returned after performing all the write command to write all the portions of data for the data unit. In an alternative embodiment, the controller 112 may return dirty status when each write command is completed, indicating that portion of the write data completed.

Figure 9:
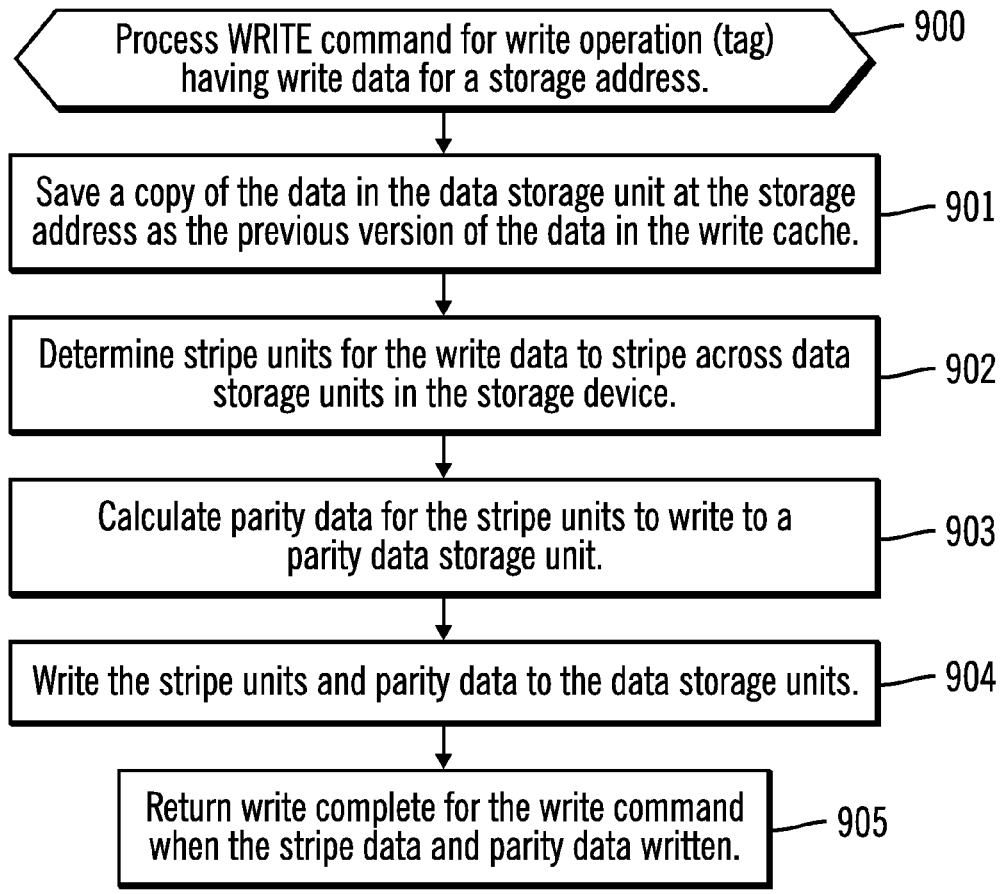

FIG. 9 illustrates an embodiment of operations performed by the controller 112 to stripe the received write data across a plurality of data units 114, including a parity data unit 114, when the data units of the storage device $102_1, 102_2 \ldots 102_n$ comprise independently addressable storage devices. The data units may 114 comprise independent storage devices, such as flash devices, SSDs, hard disk drives, etc. Alternatively, if the storage device comprises an SSD, the data units 114 may comprise dies of memory cells in the storage device $102_1, 102_2 \ldots 102_n$, such as NAND dies for an SSD storage device. In the embodiment of FIG. 9, the controller 112 may comprise a RAID controller having a write cache to cache all the data to stripe across the data units 114. Yet further, the controller 112 may implement the logic of the storage controller driver 106 to perform atomic write operations as described with respect to the storage controller driver 106.

Upon processing (at block 900) a write command for a write operation (tag) having write data for a storage address, the controller 112 saves (at block 901) a copy of the data in the data storage units 114 at the storage address as the previous version of the data in a write cache. In an alternative copy-on write implementation, the controller 112 can remember where the old data is located and write the new data to a new storage area, and an indirection table allows the location of the old data to be reused. The controller 112 determines (at block 902) stripe units for the write data to stripe across data storage units in the storage device and calculates (at block 903) erasure code parity data, such as, but not limited to, XOR parity data, for the stripe units to write to a parity data storage unit of the storage units 114. In one embodiment, the controller 112 may use a RAID algorithm to determine the stripe units and parity data according to different RAID levels. The controller 112 writes (at block 904) the stripe units and parity data to the data storage units 904 and returns (at block 905) to the host 110 upon completing the stripping of the data from the write command to the storage units 114. Parity data may be calculated using error correction codes or other parity algorithms known in the art.

Figure 10:
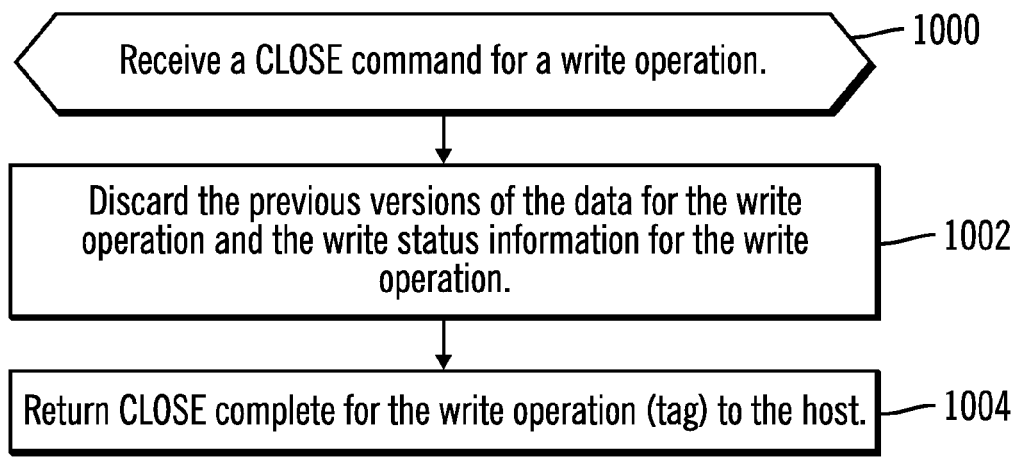
FIG. 10 illustrates an embodiment of operations performed by a storage device to process a CLOSE command.

FIG. 10 illustrates an embodiment of operations performed by the storage device controller 112 to process a CLOSE command from the storage controller driver 106. Upon receiving (at block 1000) the CLOSE command for a write operation (tag), the controller 112 discards (at block 1002) the previous versions of the data for the write operation and the write status information for the write operation, including the write status entry 300,. CLOSE complete is returned (at block 1004) for the write operation (tag) to the host system 100.

Figure 11:
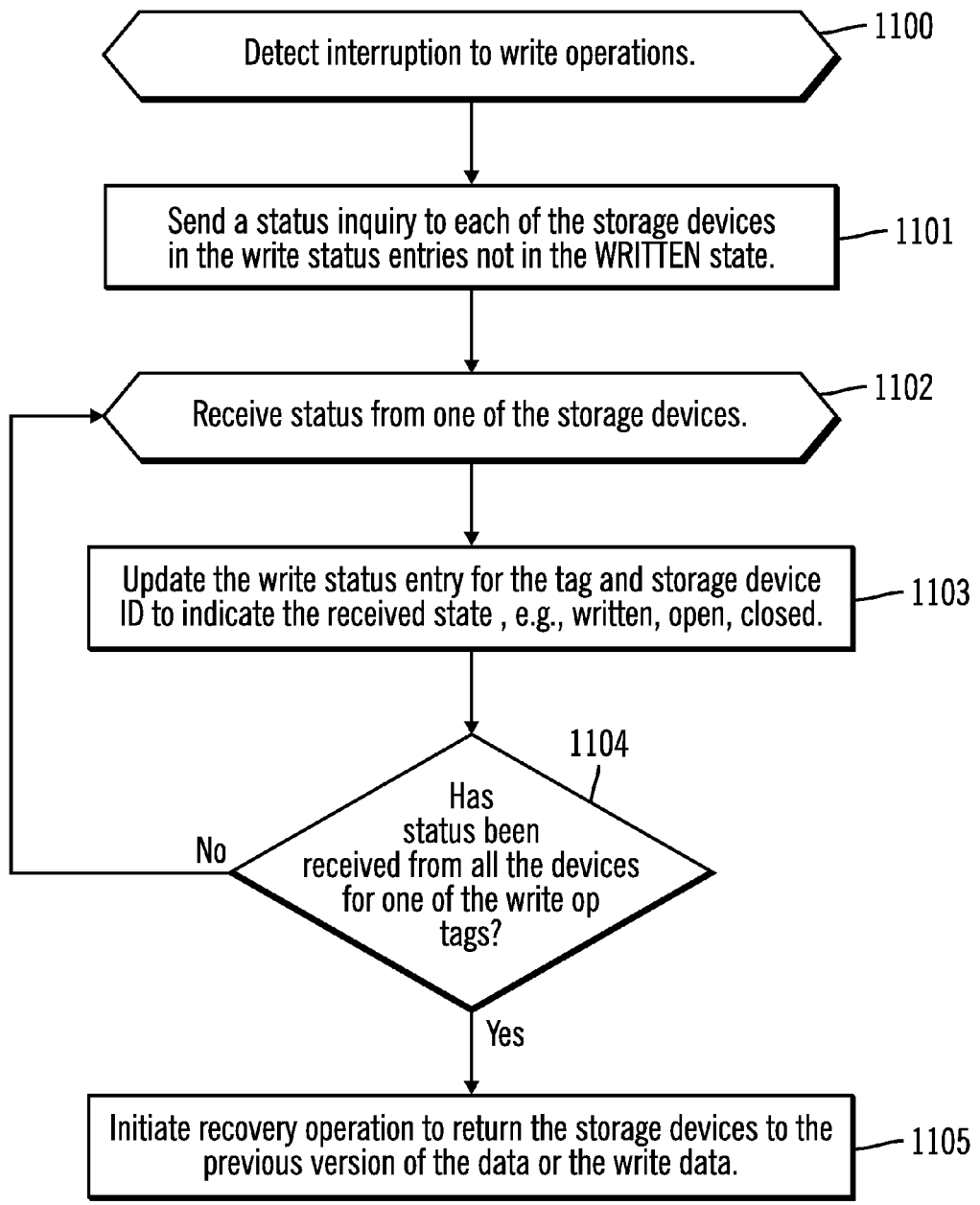
FIGS. 11, 12, and 13 illustrate embodiments of operations performed by the host system to handle an interruption to a write operation.
Figure 12:
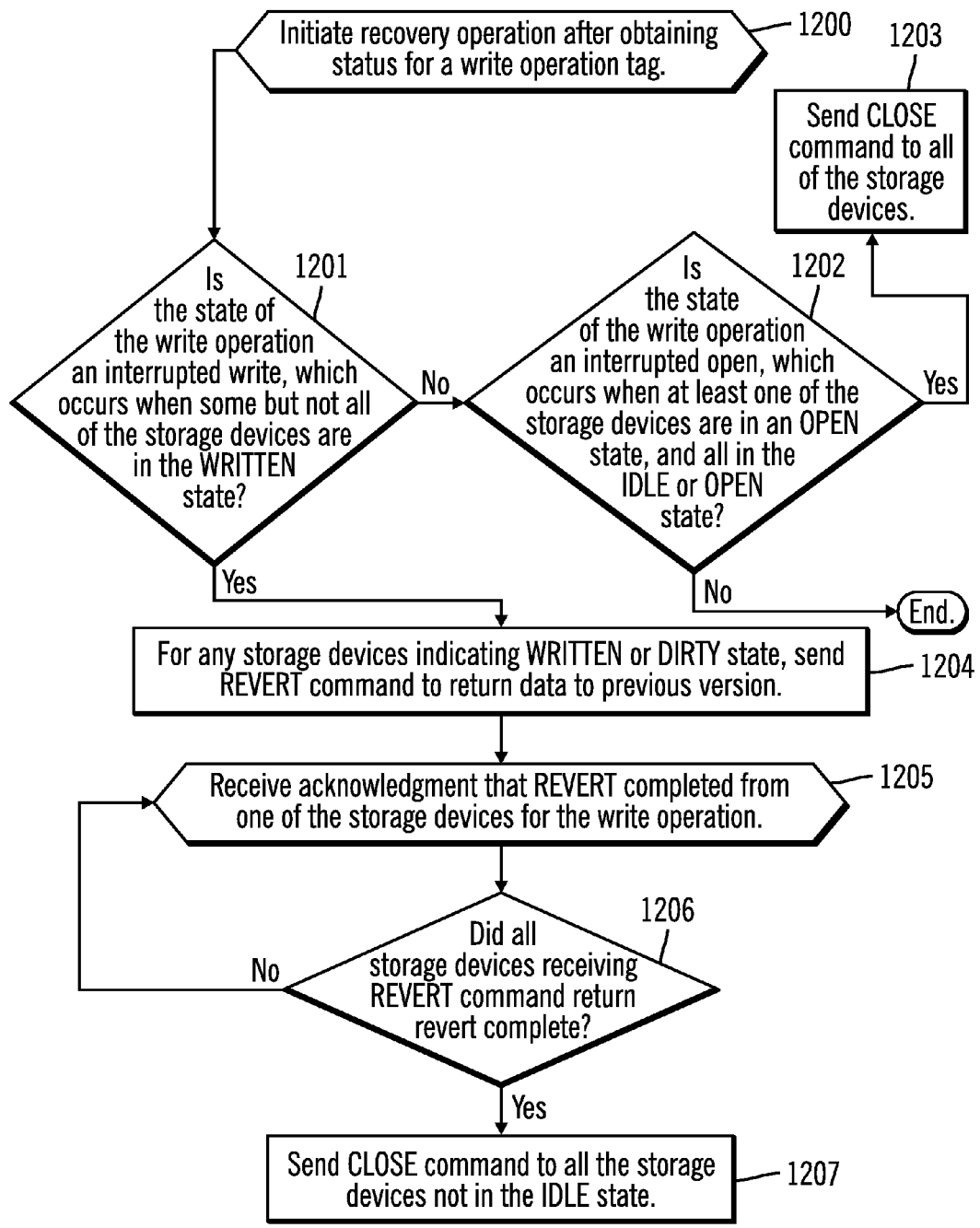
Figure 13:
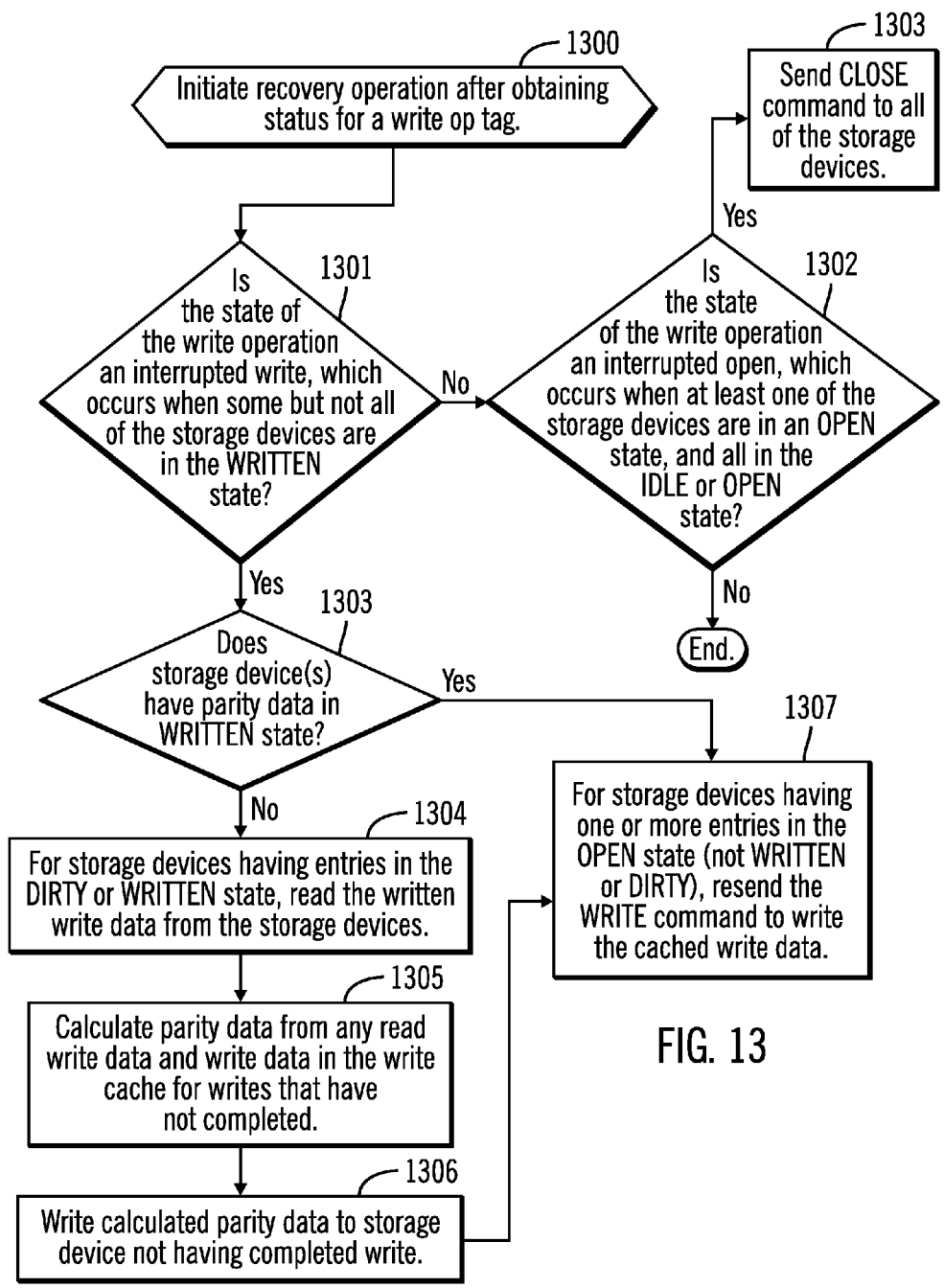

FIGS. 11-13 illustrate embodiments of operations performed by the storage controller driver 106 to recover from a failure, such as a power-on failure or other event that results in an interruption of the write operations. With respect to FIG. 11, upon detecting (at block 1100) an interruption to the write operations, the storage controller driver 106 sends (at block 1101) a status inquiry to each of the storage devices $102_1, 102_2 \ldots 102_n$ not having the WRITTEN state 206 Upon receiving (at block 1102) the state, the storage controller driver 106 updates (at block 1103) the write status entry 200, for the write operation tag 202 and storage device 204 to indicate the state 206 corresponding to the status received from the storage device, such as WRITTEN, OPEN, CLOSED, etc. If the state received is for one of a plurality of write commands sent to the storage device, then the returned state may indicate DIRTY, such that part of the data was written, but not all of the portions of the data sent with different WRITE commands. If (at block 1104) status is received for all of the storage devices $102_1, 102_2 \ldots 102_n$ for one of the write operation (tags), then the storage controller driver 106 initiates (at block 1105) a recovery operation to return the storage devices $102_1, 102_2 \ldots 102_n$ involved in the write operation to the previous version of the data (roll back) or the version of the write data (roll forward). Alternatively, the recovery operation may involve making the data in the storage device consistent by using the read with tag command to regenerate data that was in flight at the time of the power loss that can be recovered from the storage device $102_1, 102_2 \ldots 102_n$ though the read command. FIGS. 12 and 13 illustrate embodiments of operations for different types of recovery operations performed at block 1105 in FIG. 11.

FIG. 12 illustrates an embodiment of operations performed by the storage driver controller 106 to perform the recovery operation to revert back to the previous version of the data before the write operation. If there is a recovery operation, the operations of FIG. 12 may be performed for each write operation tag in the write operation status 200. Upon initiating the recovery operation (at block 1200), the storage controller driver 106 determines (at block 1201) whether the state of the write operation is an interrupted write, which occurs when some but not all of the storage devices $102_1, 102_2 \ldots 102_n$ in the write status entries 200, for the write operation tag are in the WRITTEN state. This may occur when some entries 200, indicate the WRITTEN state and others indicate the OPEN or DIRTY state or any other state indicating a write may not have completed. If (at block 1201) the state for the write operation is not an interrupted write, then the storage controller driver 106 determines (at block 1202) whether the state of the write operation tag is an interrupted open, which occurs when at least one of the storage devices $102_1, 102_2 \ldots 102_n$ are in an OPEN state and at least one is in the IDLE state. If so, then the recovery action comprises sending (at block 1203) a CLOSE command to all of the storage devices $102_1, 102_2 \ldots 102_n$. Otherwise, if (at block 1202) all are in the IDLE state, then control ends without any recovery action taken.

If (at block 1201) the state of the write operation is an interrupted write, then the storage controller driver 106 sends (at block 1204) a REVERT command to any storage device $102_1, 102_2 \ldots 102_n$ indicated in write status entries 200, as having a WRITTEN or DIRTY state to cause the storage device $102_1, 102_2 \ldots 102_n$ to roll back the updated data with the previous version of the data. Upon receiving (at block 1205) acknowledgment that the REVERT command completed from one of the storage devices for the write operation, if (at block 1206) all storage devices $102_1, 102_2 \ldots 102_n$ receiving the REVERT command have acknowledged the REVERT operation completed, then the storage controller driver 106 sends (at block 1207) a CLOSE command to all the storage devices $102_1, 102_2 \ldots 102_n$ identified in write status entries 200, for the write operation tag that are not in the IDLE state. At this point, since the data has been reverted to the previous state, any data that needs to be written would have to be recovered from the higher level application that generated the write data. Otherwise, if (at block 1206) not all of the storage devices $102_1, 102_2 \ldots 102_n$ have acknowledged that the REVERT command completed, then control proceeds back to block 1205 to wait for all REVERT commands to complete.

FIG. 13 illustrates an alternative embodiment of operations performed by the storage driver controller 106 to perform the recovery operation to complete the write operation at all of the storage devices $102_1, 102_2 \ldots 102_n$ having received the write command for the write operation. If there is a recovery operation, the operations of FIG. 13 may be performed for each write operation tag in the write operation status 200. Upon initiating the recovery operation (at block 1300), the storage controller driver 106 performs the operations at blocks 1301, 1302, and 1303 which are the same operations described with respect to blocks 1201, 1202, and 1203 in FIG. 12 to determine if the write operation has the interrupted write state or the interrupted OPEN state. Upon determining (at block 1301) that the state is the interrupted write state, for embodiments having parity data, if (at block 1306) the storage device(s) having parity data is not in the WRITTEN state, then the storage controller driver 106 reads (at block 1304) the written write data from any storage devices having entries 200, indicating the DIRTY or WRITTEN state 206. The storage controller driver 106 calculates (at block 1305) parity data from any of the write data read from the storage devices $102_1, 102_2 \ldots 102_n$ and write data in the write cache 110, for uncompleted writes. The calculated parity data is written (at block 1306) to the storage device(s) having parity.

After completing rewriting the parity (at block 1306) or if (at block 1303) the storage device(s) having parity data are in the WRITTEN state, then for each of the storage devices $102_1, 102_2 \ldots 102_n$ identified in status entries 200, for the write operation tag as in the OPEN state (write did not complete), then the storage controller driver 106 resends (at block 1307) the WRITE command to write the previously sent write data from the write cache 110. In embodiments where there is no parity data, then after determining the interrupted write state for the write operation (at block 130), control would proceed directly to block 1307.

With the described embodiments of FIG. 13, in embodiments where write complete is returned after writing all the data, then the operation at block 1307 would be performed to rewrite data for storage devices that did not complete the write. In the described embodiments, the storage device $102_1, 102_2 \ldots 102_n$ may not return intermediary DIRTY acknowledgments upon completing the write, but may wait until all the WRITE commands or sub-write commands complete and then send a write complete for all the write commands used for the writ operation. In this embodiment, the DIRTY state is only returned in response to the status inquiry during error recovery. In an alternative embodiment, the storage device $102_1, 102_2 \ldots 102_n$ may return DIRTY in response to completing one of a plurality of write commands for a write operation.

Figure 14:
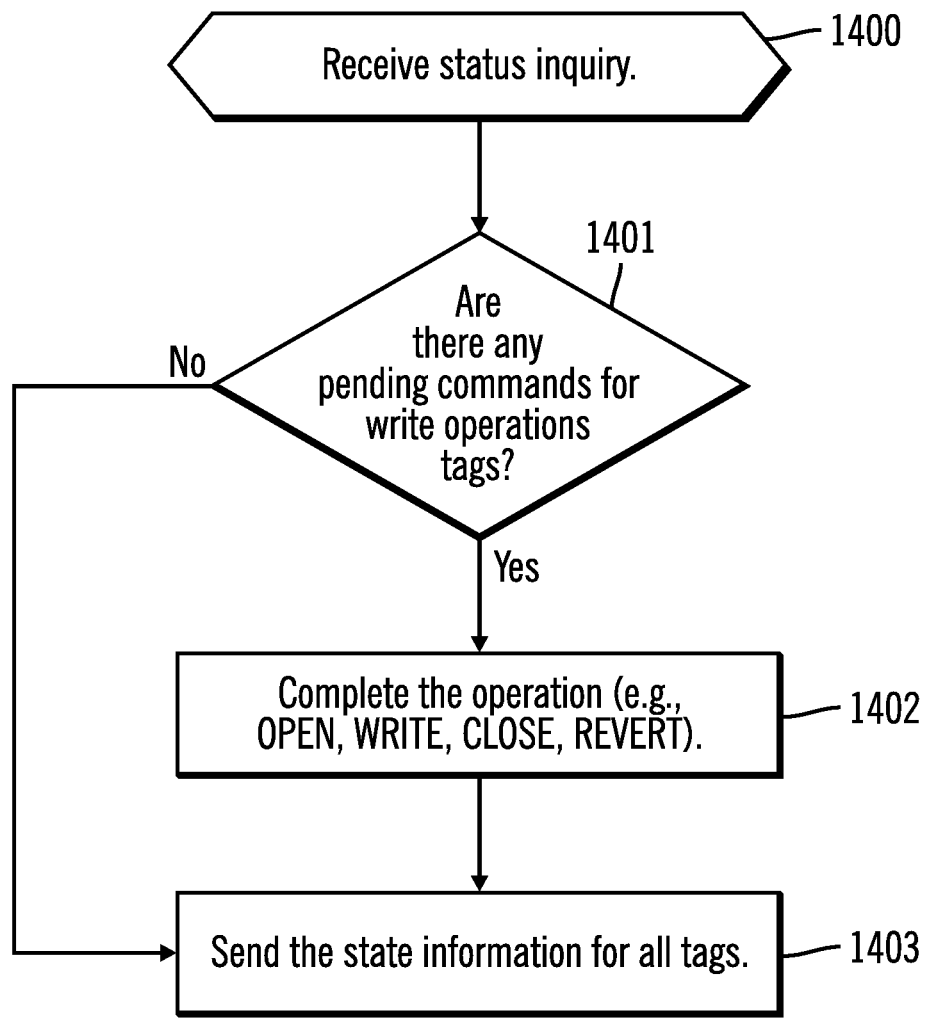
FIG. 14 illustrates an embodiment of operations performed by a storage device to process a status inquiry request.

FIG. 14 illustrates an embodiment of operations performed by the controller 112 of the storage devices $102_1, 102_2 \ldots 102_n$ in response to receiving the status inquiry form the storage controller driver 106. In response to receiving (at block 1400) the status inquiry, if (at block 1401) there is any pending uncompleted commands for any of the write operation tags maintained in the write operation status 300, then the storage device $102_1, 102_2 \ldots 102_n$ will complete the pending commands for the write operations, such as OPEN, WRITE, CLOSE, REVERT. If (at block 1401) there are no pending commands for the write operations or after completing (at block 1402) all pending commands, the controller 112 sends (at block 1403) the state information for all the write operation tags as indicated in all the write status entries $300_i$.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

The described operations of the storage controller driver 106 and the controller 112 in the storage devices $102_1$, $102_2 \ldots 102_n$ may be implemented as a method, apparatus or computer readable storage medium using standard programming and/or engineering techniques to produce software, firmware, hardware, or any combination thereof. The described operations may be implemented as code or logic maintained in a "computer readable storage medium", which may directly execute the functions or where a processor may read and execute the code from the computer storage readable medium. The computer readable storage medium includes at least one of electronic circuitry, storage materials, inorganic materials, organic materials, biological materials, a casing, a housing, a coating, and hardware. A computer readable storage medium may comprise, but is not limited to, a magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), etc. The computer readable storage medium may further comprise digital logic implemented in a hardware device (e.g., an integrated circuit chip, a programmable logic device, a Programmable Gate Array (PGA), field-programmable gate array (FPGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer. A computer readable storage medium is not comprised solely of transmission signals, but includes tangible components. Those skilled in the art will recognize that many modifications may be made to this configuration without departing from the scope of the present invention, and that the article of manufacture may comprise suitable information bearing medium known in the art.

Figure 15:
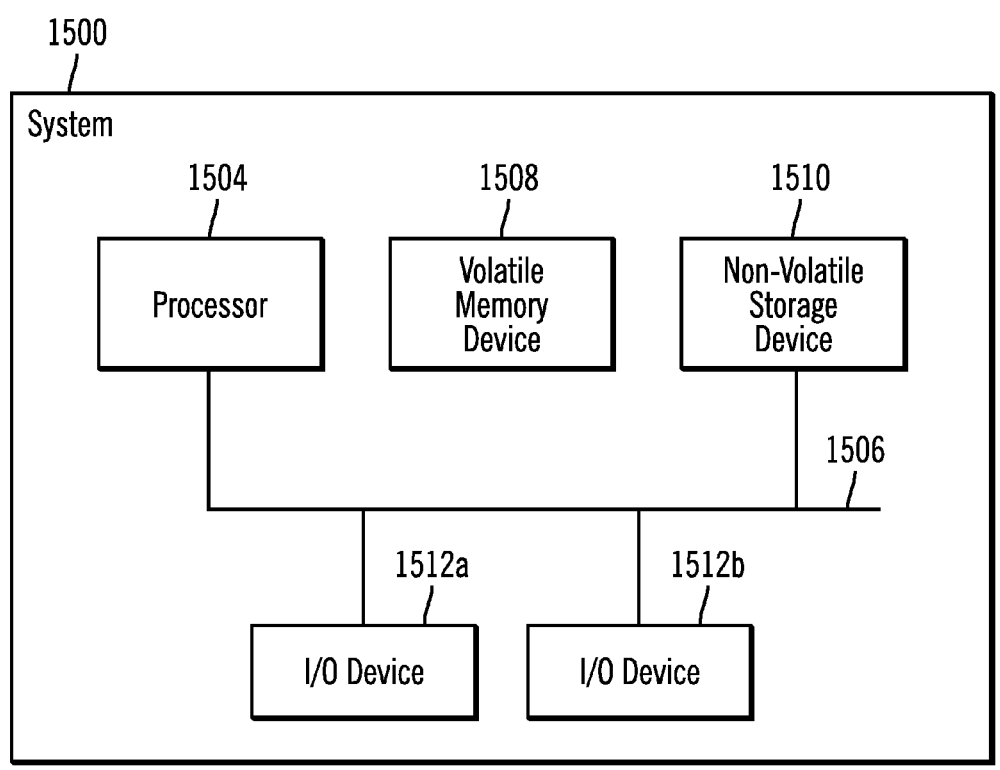
FIG. 15 illustrates a system in which the host system of FIG. 1 may be implemented.

FIG. 15 illustrates an embodiment of a system 1500 in which the host system 100 may be implemented. The system includes a processor 1504 that communicates over a bus 1506 with a volatile memory device 1508 in which programs, operands and parameters being executed are cached, such as the operating system 104 and storage controller driver 106, and a non-volatile storage device 1510, in which data and programs may be stored. The processor 1504 may also communicate with Input/Output (I/O) devices 1512*a*, 1512*b*, which may comprise input devices, display devices, graphics cards, ports, network interfaces, etc. The non-volatile storage device 1510 may be mounted to the system enclosure 1500, such as in a storage drive bay, or connected to the system 1500 through a port interface or over the network.

EXAMPLES

The following examples pertain to further embodiments.

Example 1 is a computer readable storage device having computer program instructions executed in a host system in communication with a plurality of storage devices to cause operations, the operations comprising: determining a plurality of storage devices on which to write data for a write operation; generating a tag to uniquely identify the write operation; sending a write command to each of the determined storage devices including the tag and write data to cause each of the storage devices to write the write data at the storage device, wherein each of the storage devices maintains a copy of a previous version of the data to be updated by the write operation; and sending a revert command with the tag to one of the storage devices to cause the storage device to restore the copy of the previous version of the write data at the storage device.

In Example 2, the subject matter of Examples 1 and 3-11 can optionally include that the operations further comprise: sending an open command to each of the storage devices having the tag, wherein the open command causes each of the storage devices to maintain the copy of the previous version of the data to be updated by the write operation; and wherein the write command is sent to each of the storage devices in response to receiving acknowledgment of the open command from all of the storage devices that were sent the open command.

In Example 3, the subject matter of Examples 1, 2, and 4-11 can optionally include that operations further comprise: in response to receiving acknowledgment for all of the storage devices that the write command completed at the storage device, sending a close command to each of the storage devices, wherein the close command causes each of the storage devices to remove context of the write operation including the copy of the previous version of the data.

In Example 4, the subject matter of Examples 1-3 and 5-11 can optionally include that the operations further comprise: detecting an interruption; determining that all the storage devices have not completed the write command; and sending a close command to each of the storage drives in the open state to close the write operation.

In Example 5, the subject matter of Examples 1-4 and 6-11 can optionally include that the operations further comprise: in response to detecting an interruption, determining a state of the storage devices that have not acknowledged completing the write command, wherein the revert command is sent to at least one of the storage devices determined to have completed the write command.

In Example 6, the subject matter of Examples 1-5 and 7-11 can optionally include that the determining the state of the storage devices comprises sending an inquiry to each of the storage devices having received the write command that have not acknowledged the write command completed, wherein the revert command is sent to each of the storage devices that responded to the write command indicating that the write completed and to each of the storage devices that responded to the inquiry indicating that the write completed.

In Example 7, the subject matter of Examples 1-6 and 8-11 can optionally include that the operations further comprise: caching the write data sent with the write commands; discarding the cached write data sent with one of the write commands in response to receiving acknowledgment that the write command having the write data completed; in response to detecting an interruption, determining a state of the storage devices that have received the write command and have not acknowledged that the write completed; and resending the write command with the cached write data to each of the storage devices having the state indicating that the write did not complete.

In Example 8, the subject matter of Examples 1-7 and 9-11 can optionally include that the write commands sent to the storage devices includes non-parity data sent to a plurality of the storage devices and parity data sent to at least one of the storage devices.

In Example 9, the subject matter of Examples 1-8, 10, and 11 can optionally include that in response to determining that the write command of the parity data did not complete, performing: reading the write data from each of the storage devices having the state indicating that the write command completed; and calculating the parity data from the write data read from the at least one of the storage devices and the cached write data for storage devices having the state indicating that the write did not complete.

In Example 10, the subject matter of Examples 1-9 and 11 can optionally include that a plurality of write commands are sent to each of the storage devices to write a portion of the write data for the storage device, wherein the operations further comprise: caching the portions of write data sent with the write commands; in response to detecting an interruption, determining a state of the storage devices that have received the write commands and have not acknowledged that all the writes completed; for each of the storage devices that have acknowledged that less than all the sent write commands completed, sending at least one read command to the storage device to read the portion of the write data; calculating parity data from the read portion of the write data and from the cached portions the write data sent with writes that did not complete; resending the write command s with the cached portion of the write data that did not complete and for the calculated parity data to the at least one storage devices for which the portions of data are intended.

In Example 11, the subject matter of Examples 1-10 can optionally include that the host system sends a plurality of write operations to the storage devices and for each write operation provides a tag uniquely identifying the write operation, wherein the operations further comprise: in response to detecting an interruption to the write operation sending an inquiry request to the storage devices for status for the tags maintained at the storage devices; and receiving, in response to the request, from each of the storage devices the tags of the write operations initiated at the storage devices and a status of the write operation for each of the tags indicating an open or written state.

Example 12 is a storage device in communication with a host system, wherein the storage device includes a controller that when executed performs operations, the operations comprising: receiving a write command from the host system with tag uniquely identifying a write operation and write data; in response to the write command, writing the write data to the storage device and maintaining a copy of a previous version of data updated as part of the write command; receiving a revert command with the tag identifying the write operation for which the write command was received; and in response to the revert command, restoring the copy of the previous version of the data updated by the write data.

In Example 13, the subject matter of Examples 12 and 14-18 can optionally include that the write command comprises a plurality of write commands each having a portion of write data for the write operation, wherein the operations of writing the write data and maintaining the copy of the previous version is performed for each of the write commands, wherein the operations further comprise: returning acknowledgment to the write command in response to completing the writing of the portions of the write data in all of the write commands; and indicating the portion of the data that has been written for one of the write commands as dirty.

In Example 14, the subject matter of Examples 12, 13, and 15-18 can optionally include that the operations further comprise: receiving a close command for the write operation; and deleting information on the write operation and the previous copy of the data for the write operation in response to the close command for the write operation; and returning acknowledgment to the host system of the completion of the close command.

In Example 15, the subject matter of Examples 12-14 and 16-18 can optionally include that the storage device comprises a solid state disk (SSD).

In Example 16, the subject matter of Examples 12-15, 17, and 18 can optionally include that the operations further comprise: receiving an open command with the tag from the host system for the write operation; indicating intent logging for the tag to maintain a copy of a previous version of data updated as part of the write operation identified by the tag; and returning acknowledgment of the open command in response to indicating the intent logging, wherein the write command is sent after returning acknowledgment of the open command.

In Example 17, the subject matter of Examples 12-16 and 18 can optionally include that the operations further comprise: receiving a state inquiry from the host; in response to receiving the state inquiry: completing any pending write command for the write operation; returning write complete to the host in response to completing the pending write command; and returning open state in response to determining there is no pending write command for the write operation.

In Example 18, the subject matter of Examples 12-17 can optionally include that the operation of completing the pending write command and returning the write complete or open state to the host are performed for each of a plurality of write operations open at the storage device.

Example 19 is a system in communication with a plurality of storage devices, comprising: a processor; and a computer readable storage medium having program instructions executed by the processor to perform operations, the operations comprising: determining a plurality of storage devices on which to write data for a write operation; generating a tag to uniquely identify the write operation; sending a write command to each of the determined storage devices including the tag and write data to cause each of the storage devices to write the write data at the storage device, wherein each of the storage devices maintains a copy of a previous version of the data to be updated by the write operation; and sending a revert command with the tag to one of the storage devices to cause the storage device to restore the copy of the previous version of the write data at the storage device.

In Example 20, the subject matter of Examples 19 and 21-26 can optionally include that the operations further comprise: sending an open command to each of the storage devices having the tag, wherein the open command causes each of the storage devices to maintain the copy of the previous version of the data to be updated by the write operation; and wherein the write command is sent to each of the storage devices in response to receiving acknowledgment of the open command from all of the storage devices that were sent the open command.

In Example 21, the subject matter of Examples 19, 20 and 22-26 can optionally include that the operations further comprise: in response to receiving acknowledgment for all of the storage devices that the write command completed at the storage device, sending a close command to each of the storage devices, wherein the close command causes each of the storage devices to remove context of the write operation including the copy of the previous version of the data.

In Example 22, the subject matter of Examples 19-21 and 23-26 can optionally include that the operations further comprise: detecting an interruption; determining that all the storage devices have not completed the write command; and sending a close command to each of the storage drives in the open state to close the write operation.

In Example 23, the subject matter of Examples 19-22 and 24-26 can optionally include that the operations further comprise: in response to detecting an interruption, determining a state of the storage devices that have not acknowledged completing the write command, wherein the revert command is sent to at least one of the storage devices determined to have completed the write command.

In Example 24, the subject matter of Examples 19-23 and 25-26 can optionally include that determining the state of the storage devices comprises sending an inquiry to each of the storage devices having received the write command that have not acknowledged the write command completed, wherein the revert command is sent to each of the storage devices that responded to the write command indicating that the write completed and to each of the storage devices that responded to the inquiry indicating that the write completed.

In Example 25, the subject matter of Examples 19-24 and 26 can optionally include that the operations further comprise: caching the write data sent with the write commands; discarding the cached write data sent with one of the write commands in response to receiving acknowledgment that the write command having the write data completed; in response to detecting an interruption, determining a state of the storage devices that have received the write command and have not acknowledged that the write completed; and resending the write command with the cached write data to each of the storage devices having the state indicating that the write did not complete.

In Example 26, the subject matter of Examples 19-25 can optionally include that the write commands sent to the storage devices includes non-parity data sent to a plurality of the storage devices and parity data sent to at least one of the storage devices.

Example 27 is a method, comprising: determining a plurality of storage devices on which to write data for a write operation; generating a tag to uniquely identify the write operation; sending a write command to each of the determined storage devices including the tag and write data to cause each of the storage devices to write the write data at the storage device, wherein each of the storage devices maintains a copy of a previous version of the data to be updated by the write operation; and sending a revert command with the tag to one of the storage devices to cause the storage device to restore the copy of the previous version of the write data at the storage device.

In Example 28, the subject matter of Examples 27 and 29-31 can optionally include sending an open command to each of the storage devices having the tag, wherein the open command causes each of the storage devices to maintain the copy of the previous version of the data to be updated by the write operation; and wherein the write command is sent to each of the storage devices in response to receiving acknowledgment of the open command from all of the storage devices that were sent the open command.

In Example 29, the subject matter of Examples 27, 28 30, and 31 can optionally include in response to detecting an interruption, determining a state of the storage devices that have not acknowledged completing the write command, wherein the revert command is sent to at least one of the storage devices determined to have completed the write command.

In Example 30, the subject matter of Examples 27-30 can optionally include caching the write data sent with the write commands; discarding the cached write data sent with one of the write commands in response to receiving acknowledgment that the write command having the write data completed; in response to detecting an interruption, determining a state of the storage devices that have received the write command and have not acknowledged that the write completed; and resending the write command with the cached write data to each of the storage devices having the state indicating that the write did not complete.

In Example 31, the subject matter of Examples 27-30 can optionally include that the determining the adjustment to the write amplification from the remaining storage write rate and the current storage write rate comprises determining an adjustment factor that when applied to the current storage write rate results in the remaining storage write rate.

In example 32, the subject matter of Example 27 can optionally include at least one step of:

(1) sending an open command to each of the storage devices having the tag, wherein the open command causes each of the storage devices to maintain the copy of the previous version of the data to be updated by the write operation; and wherein the write command is sent to each of the storage devices in response to receiving acknowledgment of the open command from all of the storage devices that were sent the open command; and/or (2) in response to receiving acknowledgment for all of the storage devices that the write command completed at the storage device, sending a close command to each of the storage devices, wherein the close command causes each of the storage devices to remove context of the write operation including the copy of the previous version of the data; and/or (3) detecting an interruption; determining that all the storage devices have not completed the write command; and sending a close command to each of the storage drives in the open state to close the write operation; and/or (4) in response to detecting an interruption, determining a state of the storage devices that have not acknowledged completing the write command, wherein the revert command is sent to at least one of the storage devices determined to have completed the write command; and/or (5) wherein determining the state of the storage devices comprises sending an inquiry to each of the storage devices having received the write command that have not acknowledged the write command completed, wherein the revert command is sent to each of the storage devices that responded to the write command indicating that the write completed and to each of the storage devices that responded to the inquiry indicating that the write completed; and/or (6) caching the write data sent with the write commands; discarding the cached write data sent with one of the write commands in response to receiving acknowledgment that the write command having the write data completed; in response to detecting an interruption, determining a state of the storage devices that have received the write command and have not acknowledged that the write completed; and resending the write command with the cached write data to each of the storage devices having the state indicating that the write did not complete; and/or (7) wherein the write commands sent to the storage devices includes non-parity data sent to a plurality of the storage devices and parity data sent to at least one of the storage devices; and/or (8) wherein in response to determining that the write command of the parity data did not complete, performing: reading the write data from each of the storage devices having the state indicating that the write command completed; and calculating the parity data from the write data read from the at least one of the storage devices and the cached write data for storage devices having the state indicating that the write did not complete; and/or (9) wherein a plurality of write commands are sent to each of the storage devices to write a portion of the write data for the storage device, further comprising: caching the portions of write data sent with the write commands; in response to detecting an interruption, determining a state of the storage devices that have received the write commands and have not acknowledged that all the writes completed; for each of the storage devices that have acknowledged that less than all the sent write commands completed, sending at least one read command to the storage device to read the portion of the write data; calculating parity data from the read portion of the write data and from the cached portions the write data sent with writes that did not complete; resending the write commands with the cached portion of the write data that did not complete and for the calculated parity data to the at least one storage devices for which the portions of data are intended; and/or

(10) wherein the host system sends a plurality of write operations to the storage devices and for each write operation provides a tag uniquely identifying the write operation, further comprising: in response to detecting an interruption to the write operation sending an inquiry request to the storage devices for status for the tags maintained at the storage devices; and receiving, in response to the request, from each of the storage devices the tags of the write operations initiated at the storage devices and a status of the write operation for each of the tags indicating an open or written state.

Example 33 is a method, comprising: receiving a write command from a host system with tag uniquely identifying a write operation and write data; in response to the write command, writing the write data to a storage device and maintaining a copy of a previous version of data updated as part of the write command; receiving a revert command with the tag identifying the write operation for which the write command was received; and in response to the revert command, restoring the copy of the previous version of the data updated by the write data.

In Example 34, the subject matter of Example 33 can optionally include receiving a close command for the write operation; and deleting information on the write operation and the previous copy of the data for the write operation in response to the close command for the write operation; and returning acknowledgment to the host system of the completion of the close command.

In Example 35, the subject matter of Example 33 can optionally include at least one step of:

(1) wherein the write command comprises a plurality of write commands each having a portion of write data for the write operation, wherein the operations of writing the write data and maintaining the copy of the previous version is performed for each of the write commands, further comprising: returning acknowledgment to the write command in response to completing the writing of the portions of the write data in all of the write commands; and indicating the portion of the data that has been written for one of the write commands as dirty; and/or (2) receiving a close command for the write operation; deleting information on the write operation and the previous copy of the data for the write operation in response to the close command for the write operation; and returning acknowledgment to the host system of the completion of the close command; and/or (3) wherein the storage device comprises a solid state disk (SSD); and/or (4) receiving an open command with the tag from the host system for the write operation; indicating intent logging for the tag to maintain a copy of a previous version of data updated as part of the write operation identified by the tag; and returning acknowledgment of the open command in response to indicating the intent logging, wherein the write command is sent after returning acknowledgment of the open command; and/or (5) receiving a state inquiry from the host; in response to receiving the state inquiry: completing any pending write command for the write operation; returning write complete to the host in response to completing the pending write command; and returning open state in response to determining there is no pending write command for the write operation; and/or (6) wherein the operation of completing the pending write command and returning the write complete or open state to the host are performed for each of a plurality of write operations open at the storage device.

Example 36 is an apparatus comprising means to perform a method as claimed in any preceding claim.

Example 37 is a machine-readable storage including machine-readable instructions, when executed, to implement a method or realize an apparatus or system as claimed in any preceding claim.

Example 38 is an apparatus, comprising: means for determining a plurality of storage devices on which to write data for a write operation; means for generating a tag to uniquely identify the write operation; means for sending a write command to each of the determined storage devices including the tag and write data to cause each of the storage devices to write the write data at the storage device, wherein each of the storage devices maintains a copy of a previous version of the data to be updated by the write operation; and means for sending a revert command with the tag to one of the storage devices to cause the storage device to restore the copy of the previous version of the write data at the storage device.

In Example 39, the subject matter of Example 38 can optionally include means for sending an open command to each of the storage devices having the tag, wherein the open command causes each of the storage devices to maintain the copy of the previous version of the data to be updated by the write operation; and wherein the write command is sent to each of the storage devices in response to receiving acknowledgment of the open command from all of the storage devices that were sent the open command.

What is claimed:

1. A computer readable storage device having computer program instructions executed in a host system in communication with a plurality of storage devices to cause operations to:
   determine a plurality of storage devices on which to write data for a write operation;
   generate a tag to uniquely identify the write operation;
   send a write command to each of the determined storage devices including the tag and write data to cause each of the storage devices to write the write data at the storage device, wherein each of the storage devices maintains a copy of a previous version of the data to be updated by the write operation; and
   send a revert command with the tag to one of the storage devices to cause the storage device to restore the copy of the previous version of the data at the storage device.

2. The computer readable storage device of claim 1, wherein the computer program instructions are further executed to:
   send an open command to each of the storage devices having the tag, wherein the open command causes each of the storage devices to maintain the copy of the previous version of the data to be updated by the write operation; and
   wherein the write command is sent to each of the storage devices in response to receiving acknowledgment of the open command from all of the storage devices that were sent the open command.

3. The computer readable storage device of claim 1, wherein the computer program instructions are further executed to:
   in response to receiving acknowledgment for all of the storage devices that the write command completed at the storage device, send a close command to each of the storage devices, wherein the close command causes each of the storage devices to remove context of the write operation including the copy of the previous version of the data.

4. The computer readable storage device of claim 1, wherein the computer program instructions are further executed to:
   detect an interruption;
   determining that all the storage devices have not completed the write command; and
   sending a close command to each of the storage drives in an open state to close the write operation.

5. The computer readable storage device of claim 1, wherein the computer program instructions are further executed to:
   in response to detecting an interruption, determine a state of the storage devices that have not acknowledged completing the write command, wherein the revert command is sent to at least one of the storage devices determined to have completed the write command.

6. The computer readable storage device of claim 5, wherein the determine the state of the storage devices comprises sending an inquiry to each of the storage devices having received the write command that have not acknowledged the write command completed, wherein the revert command is sent to each of the storage devices that responded to the write command indicating that the write completed and to each of the storage devices that responded to the inquiry indicating that the write completed.

7. The computer readable storage device of claim 1, wherein the computer program instructions are further executed to:
   cache the write data sent with the write commands;
   discard the cached write data sent with one of the write commands in response to receiving acknowledgment that the write command having the write data completed;
   in response to detecting an interruption, determine a state of the storage devices that have received the write command and have not acknowledged that the write completed; and
   resend the write command with the cached write data to each of the storage devices having the state indicating that the write did not complete.

8. The computer readable storage device of claim 7, wherein the write commands sent to the storage devices include non-parity data sent to a plurality of the storage devices and parity data sent to at least one of the storage devices.

9. The computer readable storage device of claim 8, wherein in response to determining that the write command of the parity data did not complete, the computer program instructions are further executed to:
   read the write data from each of the storage devices having the state indicating that the write command completed; and
   calculate the parity data from the write data read from the at least one of the storage devices and the cached write data for storage devices having the state indicating that the write did not complete.

10. The computer readable storage device of claim 1, wherein a plurality of write commands are sent to each of the storage devices to write a portion of the write data for the storage device, wherein the computer program instructions are further executed to:
    cache the portions of write data sent with the write commands;
    in response to detecting an interruption, determine a state of the storage devices that have received the write commands and have not acknowledged that all the writes completed;
    for each of the storage devices that have acknowledged that less than all the sent write commands completed, sending at least one read command to the storage device to read the portion of the write data;
    calculating parity data from the read portion of the write data and from the cached portions of the write data sent with write commands that did not complete; and
    resending the write commands with the cached portion of the write data that did not complete and for the calculated parity data to the at least one of the storage devices for which the portions of the write data are intended.

11. The computer readable storage device of claim 1, wherein the host system sends a plurality of write operations to the storage devices and for each write operation provides a tag uniquely identifying the write operation, wherein the computer program instructions are further executed to:
  in response to detecting an interruption to the write operation, send an inquiry request to the storage devices for status for the tags maintained at the storage devices; and
  receive, in response to the inquiry request, from each of the storage devices the tags of the write operations initiated at the storage devices and a status of the write operation for each of the tags indicating an open or written state.

12. A storage device comprising:
  a controller to communicate with a host system and to:
  receive, by the controller, a write command from the host system with a tag uniquely identifying a write operation and write data;
  in response to the write command, write the write data to non-volatile memory in the storage device and maintain a copy of a previous version of data updated as part of the write command;
  receive a revert command with the tag identifying the write operation for which the write command was received; and
  in response to the revert command, restore the copy of the previous version of the data updated by the write data.

13. The storage device of claim 12, wherein the write command comprises a plurality of write commands each having a portion of write data for the write operation, wherein the write of the write data and the maintain the copy of the previous version of the data are performed for each of the write commands, wherein the controller is further to:
  return acknowledgment to the write command in response to completing the writing of portions of the write data in all of the write commands; and
  indicate the portion of the write data that has been written for one of the write commands as dirty.

14. The storage device of claim 12, wherein the controller is further to:
  receive a close command for the write operation;
  delete information on the write operation and the previous copy of the data for the write operation in response to the close command for the write operation; and
  return acknowledgment to the host system of completion of the close command.

15. The storage device of claim 12, wherein the storage device comprises a solid state disk (SSD).

16. The storage device of claim 12, wherein the controller is further to:
  receive an open command with the tag from the host system for the write operation;
  indicate intent logging for the tag to maintain a copy of a previous version of data updated as part of the write operation identified by the tag; and
  return acknowledgment of the open command in response to indicating the intent logging, wherein the write command is sent after returning acknowledgment of the open command.

17. The storage device of claim 12, wherein the controller is further to:
  receive a state inquiry from the host system;
  in response to receiving the state inquiry:
    complete a pending write command for the write operation;
    return write complete to the host system in response to completing the pending write command; and
    return open state in response to determining there is no pending write command for the write operation.

18. The storage device of claim 17, wherein the complete the pending write command and return the write complete or open state to the host system are performed for each of a plurality of write operations open at the storage device.

19. A system in communication with a plurality of storage devices, comprising:
  a processor; and
  a computer readable storage medium having program instructions executed by the processor to:
    determine a plurality of storage devices on which to write data for a write operation;
    generate a tag to uniquely identify the write operation;
    send a write command to each of the determined storage devices including the tag and write data to cause each of the storage devices to write the write data at the storage device, wherein each of the storage devices maintains a copy of a previous version of the data to be updated by the write operation; and
    send a revert command with the tag to one of the storage devices to cause the storage device to restore the copy of the previous version of the data at the storage device.

20. The system of claim 19, wherein the program instructions are further executed to:
  send an open command to each of the storage devices having the tag, wherein the open command causes each of the storage devices to maintain the copy of the previous version of the data to be updated by the write operation; and
  wherein the write command is sent to each of the storage devices in response to receiving acknowledgment of the open command from all of the storage devices that were sent the open command.

21. The system of claim 19, wherein the program instructions are further executed to:
  in response to detecting an interruption, determine a state of the storage devices that have not acknowledged completing the write command, wherein the revert command is sent to at least one of the storage devices determined to have completed the write command.

22. A method, comprising:
  determining a plurality of storage devices on which to write data for a write operation;
  generating a tag to uniquely identify the write operation;
  sending a write command to each of the determined storage devices including the tag and the write data to cause each of the storage devices to write the write data at the storage device, wherein each of the storage devices maintains a copy of a previous version of the data to be updated by the write operation; and
  sending a revert command with the tag to one of the storage devices to cause the storage device to restore the copy of the previous version of the data at the storage device.

23. The method of claim 22, further comprising:
  sending an open command to each of the storage devices having the tag, wherein the open command causes each of the storage devices to maintain the copy of the previous version of the data to be updated by the write operation; and
  wherein the write command is sent to each of the storage devices in response to receiving acknowledgment of the open command from all of the storage devices that were sent the open command.

24. The method of claim 22, further comprising:
in response to detecting an interruption, determining a state of the storage devices that have not acknowledged completing the write command, wherein the revert command is sent to at least one of the storage devices determined to have completed the write command.

25. The method of claim 22, further comprising:
caching the write data sent with the write commands;
discarding the cached write data sent with one of the write commands in response to receiving acknowledgment that the write command having the write data completed;
in response to detecting an interruption, determining a state of the storage devices that have received the write command and have not acknowledged that the write completed; and
resending the write command with the cached write data to each of the storage devices having the state indicating that the write did not complete.

* * * * *